US012505739B2

(12) United States Patent
Tariq et al.

(10) Patent No.: US 12,505,739 B2
(45) Date of Patent: *Dec. 23, 2025

(54) EMERGENCY VEHICLE DETECTION AND RESPONSE

(71) Applicant: Zoox, Inc., Foster City, CA (US)

(72) Inventors: Sarah Tariq, Palo Alto, CA (US); Ravi Gogna, San Jose, CA (US); Marc Wimmershoff, Palo Alto, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/947,561

(22) Filed: Sep. 19, 2022

(65) Prior Publication Data

US 2023/0033315 A1    Feb. 2, 2023

Related U.S. Application Data

(63) Continuation of application No. 16/732,151, filed on Dec. 31, 2019, now Pat. No. 11,450,205.

(51) Int. Cl.
  *G08G 1/0967*      (2006.01)
  *B60W 30/18*       (2012.01)
  (Continued)

(52) U.S. Cl.
  CPC .  *G08G 1/096725* (2013.01); *B60W 30/18163* (2013.01); *B60W 60/001* (2020.02);
  (Continued)

(58) Field of Classification Search
  CPC .............. G08G 1/096725; B60W 60/001
  See application file for complete search history.

(56) References Cited

U.S. PATENT DOCUMENTS 10,825,340 B1 * 11/2020 Floyd ................... G08G 1/0965
11,661,057 B2 *  5/2023 Abe .................. B60W 60/0055
                                              701/93
(Continued)

FOREIGN PATENT DOCUMENTS

WO     WO2018057765 A1    3/2018

OTHER PUBLICATIONS

Office Action for U.S. Appl. No. 16/732,151, mailed on Oct. 7, 2021, Tariq, "Emergency Vehicle Detection and Response", 16 pages.

(Continued)

*Primary Examiner* — Jess Whittington
(74) *Attorney, Agent, or Firm* — Lee & Hayes, P.C.

(57) ABSTRACT

Techniques for detecting and responding to an emergency vehicle are discussed. A vehicle computing system may determine that an emergency vehicle based on sensor data, such as audio and visual data. In some examples, the vehicle computing system may determine aggregate actions of objects (e.g., other vehicles yielding) proximate the vehicle based on the sensor data. In such examples, a determination that the emergency vehicle is operating may be based on the actions of the objects. The vehicle computing system may, in turn, identify a location to move out of a path of the emergency vehicle (e.g., yield) and may control the vehicle to the location. The vehicle computing system may determine that the emergency vehicle is no longer relevant to the vehicle and may control the vehicle along a route to a destination. Determining to yield and/or returning to a mission may be confirmed by a remote operator.

19 Claims, 8 Drawing Sheets

(51) Int. Cl.
*B60W 60/00* (2020.01)
*G08G 1/01* (2006.01)
*G08G 1/017* (2006.01)
*G08G 1/056* (2006.01)
*H04L 67/12* (2022.01)

(52) U.S. Cl.
CPC ........... *G08G 1/0112* (2013.01); *G08G 1/012* (2013.01); *G08G 1/017* (2013.01); *G08G 1/056* (2013.01); *B60W 2420/403* (2013.01); *B60W 2420/408* (2024.01); *B60W 2420/54* (2013.01); *B60W 2554/402* (2020.02); *B60W 2556/45* (2020.02); *B60W 2754/20* (2020.02); *B60W 2754/70* (2020.02); *B60W 2756/10* (2020.02); *H04L 67/12* (2013.01)

(56) References Cited

U.S. PATENT DOCUMENTS

| | | | |
|---|---|---|---|
| 2017/0076594 A1* | 3/2017 | Scofield | H04B 7/18504 |
| 2017/0120804 A1 | 5/2017 | Kentley et al. | |
| 2017/0222612 A1 | 8/2017 | Zollner | |
| 2017/0249839 A1* | 8/2017 | Becker | G08G 1/096725 |
| 2017/0297576 A1* | 10/2017 | Halder | G01C 21/3415 |
| 2018/0350391 A1* | 12/2018 | Moore | G10L 25/51 |
| 2019/0377352 A1* | 12/2019 | Weißwange | B60W 60/0027 |
| 2020/0276973 A1* | 9/2020 | Meijburg | G08G 1/096816 |
| 2021/0114617 A1* | 4/2021 | Phillips | G01C 21/3453 |
| 2021/0197822 A1* | 7/2021 | Jhang | B60W 30/0953 |
| 2021/0201676 A1 | 7/2021 | Tariq et al. | |

OTHER PUBLICATIONS

Office Action for U.S. Appl. No. 16/732,151, mailed on Feb. 10, 2022, Tariq, "Emergency Vehicle Detection and Response", 21 pages.

The PCT Search Report and Written Opinion mailed Feb. 25, 2021 for PCT/US20/67160, 10 pages.

* cited by examiner

200A

```
┌─────────────────────┐
│  RECEIVE SENSOR DATA │
│  ASSOCIATED WITH AN  │
│ ENVIRONMENT IN WHICH A│ • • •
│   VEHICLE OPERATES   │
│         202          │
└──────────┬──────────┘
           ▼
┌─────────────────────┐
│  DETERMINE, BASED AT │
│  LEAST IN PART ON THE│
│   SENSOR DATA, THAT AN│
│   EMERGENCY VEHICLE IS│ • • •
│    OPERATING IN AN   │
│    EMERGENCY STATE   │
│         204          │
└──────────┬──────────┘
           ▼
┌─────────────────────┐
│  DETERMINE, BASED AT │
│  LEAST IN PART ON THE│
│  SENSOR DATA, AT LEAST│
│  ONE OF A LOCATION OR A│
│  PREDICTED TRAJECTORY │ • • •
│    ASSOCIATED WITH THE│
│    EMERGENCY VEHICLE │
│         206          │
└──────────┬──────────┘
           ▼
┌─────────────────────┐
│   CONTROL THE VEHICLE│
│ BASED AT LEAST IN PART ON│
│ THE AT LEAST ONE OF THE│
│     LOCATION OR THE  │ • • •
│  PREDICTED TRAJECTORY│
│   ASSOCIATED WITH THE│
│    EMERGENCY VEHICLE │
│         210          │
└──────────┬──────────┘
           ▼
         ( 2B )
```

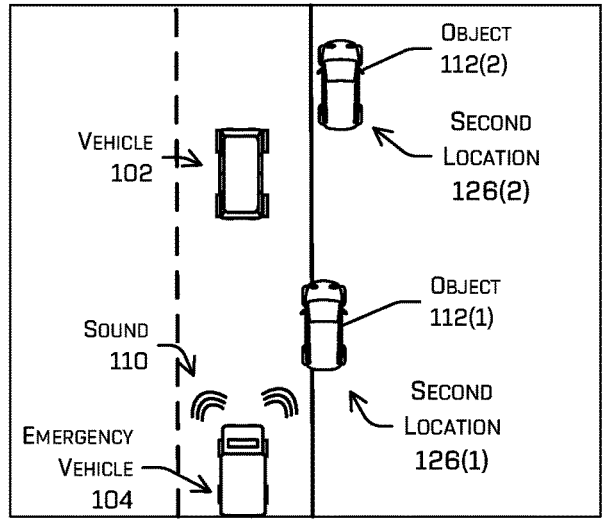
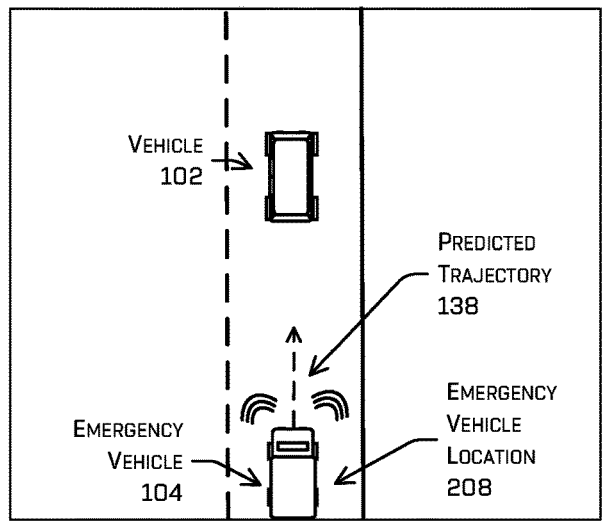
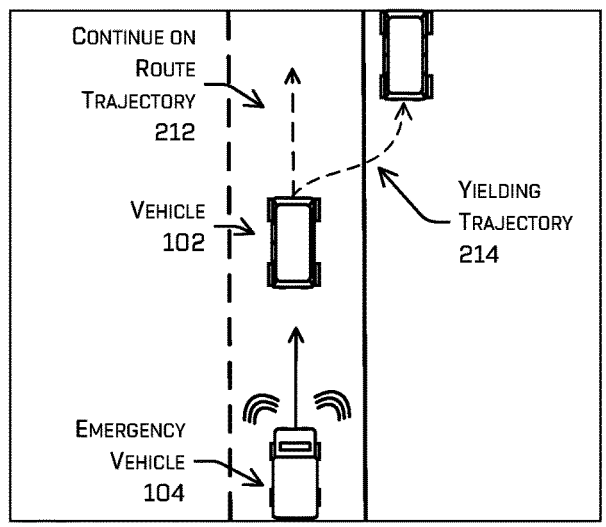

FIG. 2A

EMERGENCY VEHICLE DETECTION AND RESPONSE

CROSS REFERENCE TO RELATED APPLICATIONS

This is a continuation application which claims priority to commonly assigned, co-pending U.S. patent application Ser. No. 16/732,151, filed Dec. 31, 2019. Application Ser. No. 16/732,151 is fully incorporated herein by reference.

BACKGROUND

Vehicles often encounter emergency vehicles in an environment. During an emergency, the emergency vehicle may drive rapidly and may use lights and/or sirens to announce its presence. As the emergency vehicle has a higher priority in driving, non-emergency vehicles should yield to the emergency vehicle. In the context of an autonomous vehicle, it may be important for the autonomous vehicle to have a scheme to detect the emergency vehicle and respond to an occurrence of the emergency vehicle in its environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A is an example process for detecting and responding to an emergency vehicle, in accordance with examples of this disclosure.

DETAILED DESCRIPTION

Figure 1:
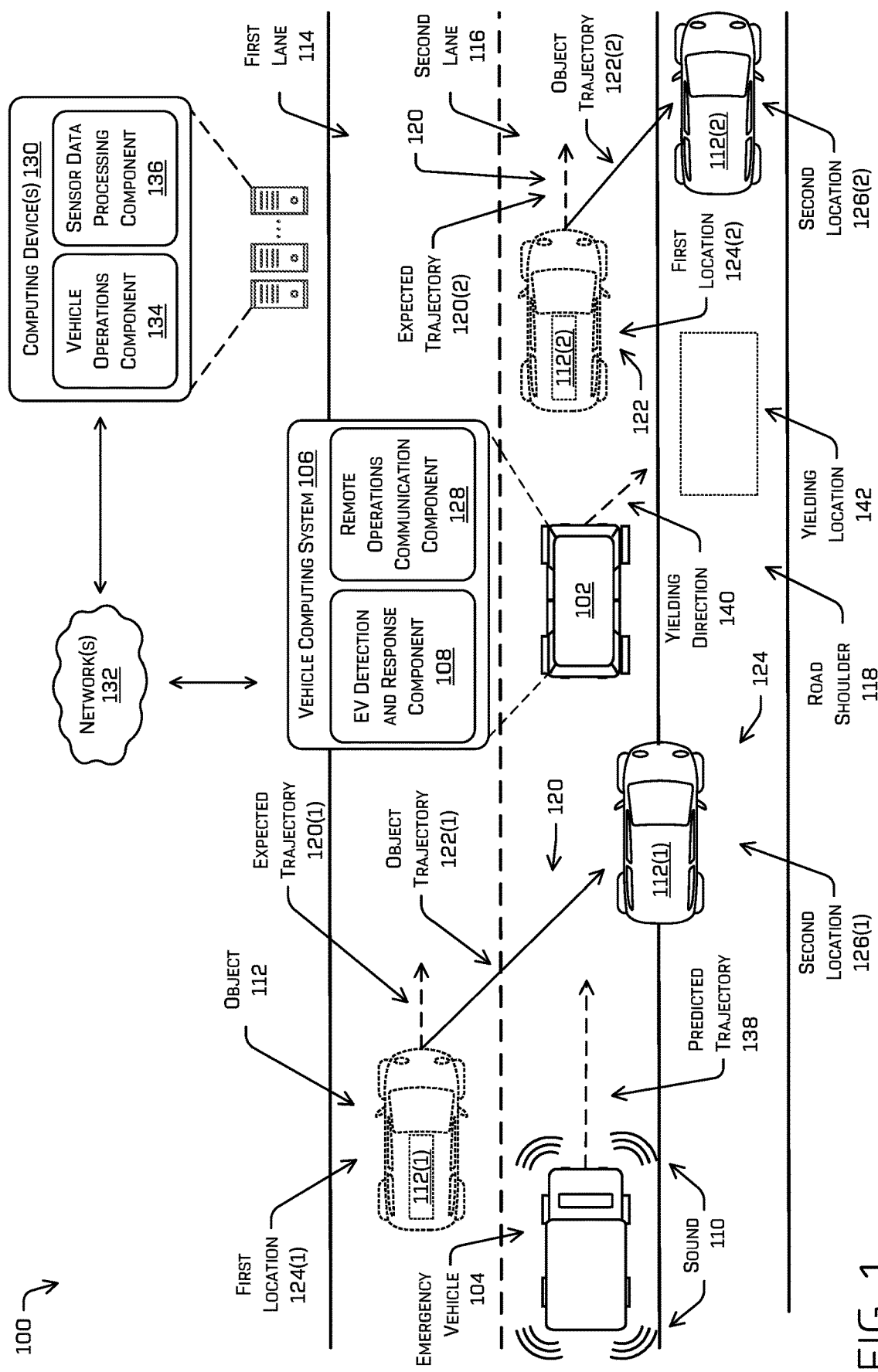
FIG. 1 is an example environment in which an emergency vehicle detection and response system of an autonomous vehicle may detect an emergency vehicle and determine to yield to the emergency vehicle, in accordance with examples of the disclosure.

This disclosure is directed to techniques for determining that an emergency vehicle is operating in an emergency state in an environment of a vehicle and determining to yield to the emergency vehicle. The emergency vehicle may include a police vehicle (e.g., police car, prison transport vehicle, motorcycle, etc.), a fire vehicle (e.g., fire engine, fire chief vehicle, etc.), an ambulance, or any other vehicle configured to provide emergency services. The vehicle may include an autonomous vehicle comprising one or more sensors. A vehicle computing system of the vehicle may receive sensor data from the sensors, such as audio data, image data, lidar data, radar data, and the like, representative of the environment. The vehicle computing system may determine, based on the sensor data, that the emergency vehicle is operating in the emergency state. In some examples, the vehicle computing system may determine that the emergency vehicle is operating in the emergency state based on a determination that the emergency vehicle is emitting a siren, a flashing light, or other signal indicative of an emergency state. In some examples, the vehicle computing system may determine that the emergency vehicle is operating in the emergency state based on a determination that a flow of traffic (e.g., movement other vehicles in the environment) is indicative of other vehicles yielding to the emergency vehicle. Based on a determination that the emergency vehicle is operating in the emergency state, the vehicle computing system may control the vehicle out of the path of the emergency vehicle.

In various examples, the vehicle computing system may receive visual data representing the environment. The visual data may include image data captured by one or more cameras, lidar data, radar data, and the like. In various examples, the vehicle computing system may be configured to determine, based on the visual data, that an object is present in the environment. In various examples, the vehicle computing system may be configured to determine a semantic classification associated with the detected object. In at least one example, the semantic classification may include a classification as an emergency vehicle (e.g., police vehicle, fire vehicle, ambulance, etc.).

In various examples, the vehicle computing system may determine, based at least in part on the visual data, that the detected object includes one or more flashing lights. In some examples, the flashing lights may include a lighting sequence indicative of an emergency state. In some examples, the vehicle computing system may be configured to determine a color associated with the flashing light(s). In such examples, the vehicle computing system may determine the emergency state based in part on the color. The colors may include, but are not limited to red, blue, amber, green, magenta, white, and/or any other color used by an emergency service vehicle. For example, the vehicle computing system may detect a police car emitting a flashing blue and red lights in the environment. The vehicle computing system may determine, based on at least one of the flashing lights or the blue and red color thereof, that the police car is in an emergency state. In various examples, the vehicle computing system may determine the classification of the emergency vehicle, the flashing light and/or lighting sequence, and/or the color associated with the emergency state based on one or more machine learned models. In such examples, the machine learned models may be trained based on training data comprising a plurality of emergency vehicles emitting lights indicative of an emergency state.

In various examples, the vehicle computing system may determine that the emergency vehicle is in the emergency state based on audio data captured by one or more audio sensors. In some examples, the vehicle computing system may be configured to detect an emergency sound (e.g., siren, audio signal) emitted by the emergency vehicle. In some examples, based on the emergency sound, the vehicle computing system may determine that the emergency vehicle is operating in the emergency state.

In some examples, the vehicle computing system may determine a direction of arrival associated with the emergency sound. In some examples, the vehicle computing system may determine the direction of arrival based on techniques described in U.S. patent application Ser. No. 16/661,898, filed Oct. 23, 2019 and entitled "Emergency Vehicle Detection" the entire contents of which are incorporated herein by reference. In various examples, the vehicle computing system may determine the emergency sound and/or the direction of arrival based on one or more machine learned models. In such examples, the machine learned models may be trained based on training data comprising a plurality of emergency sounds received from different directions (e.g., angular directions relative to the vehicle).

In various examples, the vehicle computing system may determine that the emergency vehicle is in the emergency state based on actions associated with one or more objects (e.g., cars, trucks, motorcycles, etc. other than the emergency vehicle) in the environment. In some examples, the vehicle computing system may detect the objects based on the sensor data. The vehicle computing system may determine one or more actual trajectories associated with the objects. The actual trajectories may represent movement of the objects through the environment over time. In various examples, the vehicle computing system may compare the actual trajectories to expected trajectories associated with the objects. Based on a determination that the actual trajectories differ from the expected trajectories by a threshold (e.g., threshold change in speed, threshold change in direction, threshold distance from an expected route of travel, etc.), the vehicle computing system may determine that actions associated with the objects are indicative yielding to the emergency vehicle. Based at least in part on a determination that the objects are yielding to the emergency vehicle, the vehicle computing system may determine that the emergency vehicle is operating in the emergency state.

In various examples, the vehicle computing system may determine a probability that the emergency vehicle is operating in the emergency state. The probability may be based on the visual data, the audio data, and/or the actions associated with the object(s). The probability may represent a confidence of the vehicle computing system that the emergency vehicle is operating in the emergency state. In various examples, based on a determination that the probability is below a threshold, the vehicle computing system may determine to contact a remote computing device for confirmation of the emergency state. In such examples, responsive to establishing a connection with the remote computing device, the vehicle computing system may send sensor data (raw data) and/or data based on the sensor data (processed data) associated with the emergency vehicle to the remote computing device. In some examples, the remote computing device may be configured to process the sensor data to determine whether the emergency vehicle is operating in the emergency state. In at least one examples, a human operator may determine, based on the sensor data and/or data based on the sensor data, whether the emergency vehicle is operating in the emergency state.

In various examples, based on a determination that the probability meets or exceeds the threshold probability, the vehicle computing system may determine that the emergency vehicle is operating in the emergency state. In some examples, based on at least one of a determination or an indication from the remote computing device that the emergency vehicle is operating in the emergency state, the vehicle computing system may determine whether to yield to the emergency vehicle. In some examples, a determination to yield may be based on an indication to yield (e.g., an instruction to yield) received from the remote computing device. In such an example, the vehicle computing device may yield responsive to the instruction received from the remote computing device. For example, a remote operator may determine based on received sensor data that an emergency vehicle is operating in an emergency state in the environment. The remote operator may send an indication that the emergency vehicle is operating in the emergency state and an instruction to yield to the emergency vehicle (e.g., pull-over, stop forward movement, etc.).

In some examples, the determination to yield may be based on one or more locations associated with the emergency vehicle, a predicted trajectory, and/or a direction of arrival associated therewith. In such examples, the vehicle computing system may determine the location(s) of the emergency vehicle over time and/or the predicted trajectory associated therewith. The predicted trajectory may represent a path of the emergency vehicle through the environment. The vehicle computing system may determine the predicted trajectory associated with the emergency vehicle based on techniques described in U.S. patent application Ser. No. 15/807,521, filed Nov. 8, 2017, and entitled "Probabilistic Heat Maps for Behavior Prediction," U.S. patent application Ser. No. 16/151,607, filed Oct. 4, 2018 and entitled "Trajectory Prediction on Top-Down Scenes," and in U.S. patent application Ser. No. 16/504,147 filed Jul. 5, 2019 and entitled "Prediction on Top-Down Scenes based on Action Data," the entire contents of each are incorporated herein by reference. In various examples, the location(s), the predicted trajectory, and/or the direction of arrival may provide an indication that the emergency vehicle is approaching the vehicle (e.g., getting closer). In such examples, the vehicle computing system may determine to yield based on the determination that the emergency vehicle is approaching.

In various examples, the determination to yield may be based on a determination that the emergency vehicle and the vehicle share (or will share at a future time based on the predicted trajectory) at least one of a driving lane, a direction of travel on a road, an intersection, a section of road, or the like. In various examples, the determination to yield may be based on one or more rules of the road (e.g., laws, regulations, etc. associated with operating in the environment). For example, the rule(s) of the road may require vehicles to slow or stop forward movement and yield to an emergency vehicle operating in an emergency state on the road within a threshold distance of a vehicle, such as regardless of a direction of travel of the emergency vehicle. Accordingly, the vehicle computing system may determine to yield to a detected emergency vehicle located on the road within the threshold distance.

Based at least in part on a determination to yield to the emergency vehicle, the vehicle computing system may determine a yielding direction (e.g., direction to move out of the emergency vehicle path), and/or a yielding location. The yielding direction may include a direction in which the vehicle may legally travel on a drivable surface from a current position out of a path of the emergency vehicle. The yielding location may include a location associated with the drivable surface that satisfies one or more conditions. The conditions may include that the yielding location is located on a drivable surface, clear of objects, visible to the vehicle (e.g., not occluded), and not associated with the path of the emergency vehicle.

In various examples, the yielding direction and/or location may be based on the instruction to yield from the remote computing device (e.g., the remote operator). In such examples, the vehicle computing system may control the vehicle based at least in part on the instruction. In some examples, the yielding direction and/or location may be based on the location(s) and/or predicted trajectory associated with the emergency vehicle. For example, a vehicle may operate on a single lane road with an emergency vehicle approaching from behind in the lane. The vehicle computing system may determine to yield by pulling over to the right side of the road, such as on a shoulder, to clear the lane for the emergency vehicle to pass. In another example, the vehicle computing system controlling the vehicle on the single lane road may determine that the emergency vehicle is operating on the shoulder of a road to the right of the lane. The vehicle computing system may determine to yield by slowing the vehicle to a stopped position (e.g., yielding location) in the lane.

In various examples, the vehicle computing system may determine a lane associated with the emergency vehicle and may determine the yielding direction and/or yielding location based on the lane associated with the emergency vehicle. In such examples, the vehicle computing system may determine the lane in which the emergency vehicle is operating and may initiate movement away from the lane. In some examples, the movement away from the lane may include moving to another lane proximate the lane. In some examples, the movement may include moving across two or more lanes. In such examples, the movement may be incremental (e.g., one lane at a time) or continuous (e.g., continuous movement across the lanes). For example, the vehicle computing system may determine that the vehicle and the emergency vehicle operating in the emergency state share a lane. The vehicle computing system may determine that an adjacent lane is clear of objects and may control the vehicle into the adjacent lane.

In various examples, the vehicle computing system may determine the yielding direction and/or the yielding location based on the actions associated with the objects. In some examples, the vehicle computing system may determine that a threshold number and/or percentage of objects operating in the environment are moving in a particular direction. In such examples, the vehicle computing system may determine to yield based on the movement in the particular direction. For example, the vehicle computing system may determine that a threshold percentage of objects are pulling over to the right for an emergency vehicle. Based on the actions of the objects, the vehicle computing system may determine to pull over to the right.

Based on a determination to yield, the yielding direction, and/or the yielding location, the vehicle computing system may determine a yielding trajectory. In various examples, the yielding trajectory may represent a vehicle trajectory out of the path of the emergency vehicle. In some examples, the yielding trajectory may include a negative acceleration of the vehicle. In such examples, the vehicle computing system may control the vehicle to slow based on the yielding trajectory. In at least one example, the vehicle computing system may control the vehicle to a stopped position.

In various examples, the vehicle computing system may monitor movement of the emergency vehicle through the environment. In some examples, the vehicle computing system may determine that one or more release criteria are satisfied. The release criteria may represent criteria associated with the vehicle release from the yielding location and/or yielding trajectory. The release criteria may include that the emergency vehicle is at least a threshold distance away from the vehicle, is traveling away from the vehicle, is no longer in the emergency state, that actions associated with the other objects are indicative of forward movement, and the like. In some examples, the vehicle computing system may determine that the release criteria are satisfied based on visual data and/or audio data. In some examples, the vehicle computing system may determine the release criteria are satisfied based on an indication of release received from the remote computing device. In such an example, the remote computing device and/or a remote operator may determine that the release criteria are satisfied and may provide the indication of release to the vehicle.

Based on a determination that the release criteria are satisfied, the vehicle computing system may generate a vehicle trajectory from the yielding location to a destination and may control the vehicle based on the vehicle trajectory.

The techniques discussed herein can improve a functioning of a computing device of a vehicle in a number of ways. The computing system may be configured to assess a scene proximate a vehicle and determine actions associated with other vehicles. The computing system may utilize the actions of other vehicles in determining an action for the vehicle to take. For example, other vehicles are pulling over to the right, so the vehicle computing system may determine to cause the vehicle to pull over to the right. By determining an action based on observed actions of other vehicles, the vehicle computing system may reduce an amount of processing power needed to determine the action for the vehicle to take. The reduction in processing power may improve the functioning of the vehicle computing system. Additionally, by using a combination of visual and audio data, the vehicle computing system may improve accuracy and response time associated with responding to emergency vehicles in an environment. Accordingly, the vehicle computing system may improve the safe operation of the vehicle on the road.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using audio data. Additionally, the techniques described herein can be used with real data (e.g., captured using sensor(s)), simulated data (e.g., generated by a simulator), or any combination of the two.

FIG. 1 is an example environment 100 in which an emergency vehicle detection and response system of an autonomous vehicle 102 may detect an emergency vehicle 104 and determine to yield to the emergency vehicle 104, in accordance with examples of the disclosure.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 may be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In various examples, a vehicle computing system 106 associated with the vehicle 102 may receive sensor data from one or more sensors. The sensor(s) may include lidar sensors, radar sensors, cameras (e.g., RGB, IR, intensity, depth, time of flight, etc.), audio sensors, ultrasonic transducers, sound navigation and ranging sonar sensors, location sensors (e.g., global positioning system (GPS), compass, etc.), inertial sensors (e.g., inertial measurement units, accelerometers, magnetometers, gyroscopes, etc.), wheel encoders, environment sensors (e.g., temperature sensors, humidity sensors, light sensors, pressure sensors, etc.), etc. The sensor(s) may generate sensor data (raw sensor data), which can be utilized by the vehicle computing system 106 associated with the vehicle 102.

In at least one example, the vehicle computing system 106 may determine the emergency vehicle 104 operating in the environment 100 based on the sensor data. In various examples, the vehicle computing system 106 may classify a detected object (e.g., car, truck, motorcycle) as the emergency vehicle 104 based on a size, shape, color, and/or other features associated with the emergency vehicle 104. In some examples, the vehicle computing system 104 may include a machine learned model configured to classify the detected object as the least emergency vehicle 104. In such examples, the machine learned model may be trained based on training data comprising a plurality of emergency vehicles 104.

In various examples, an emergency vehicle (EV) detection and response component 108 of the vehicle computing system 106 may be configured to determine whether the emergency vehicle 104 is operating in an emergency state based on the sensor data. In some examples, the EV detection and response component 108 may determine the emergency state based on visual data (e.g., image data captured by one or more cameras, lidar data, radar data, etc.). In various examples, the EV detection and response component 108 may determine, based on the visual data, that a light associated with the emergency vehicle 104 is flashing. In some examples, the vehicle computing system may determine that the flashing light represents the emergency state. In some examples, the EV detection and response component 108 may determine a sequence of lights flashing. In some examples, the determination of the emergency state may be based the flashing light sequence. For example, alternating (e.g., between left and right) flashing lights may be indicative of an emergency state (e.g., police car traveling to an emergency) and lights flashing together may be indicative of a cautionary state (e.g., police car stopped on the side of the road).

In various examples, the EV detection and response component 108 may determine the emergency state based on a color of a light emitted from the emergency vehicle. The colors may include, but are not limited to red, blue, amber, green, magenta, white, and/or any other color used by an emergency service vehicle. For example, the EV detection and response component 108 may detect an ambulance emitting flashing red lights. Based on a determination that the lights are red, the vehicle computing system may determine that the ambulance is in an emergency state. In various examples, the EV detection and response component 108 may be configured to determine one or more colors indicative of an emergency state based on a location (e.g., a country, a region of a country, etc.) of the vehicle 102. In such examples, the vehicle computing system 106 may be configured to determine the emergency state based on the location. For example, a first vehicle 102 operating in a first country may be configured to determine the emergency state based on a first set of colors and a second vehicle 102 operating in a second country may be configured to determine the emergency state based on a different set of colors.

In various examples, the EV detection and response component 108 may determine the emergency state based on an output from a machine learned model configured to determine the emergency state based at least in part on the flashing light, colors associated with the lights, and/or the light sequence. In such examples, the machine learned model may be trained based on training data comprising a plurality of emergency vehicles with one or more lights. In some examples, the machine learned model configured to classify the emergency vehicles may be the same or different machine learned model as that trained to determine the emergency state based on the flashing lights, the colors and/or light sequence.

In various examples, the EV detection and response component 108 may determine the emergency state based on audio data captured by one or more audio sensors. In some examples, the vehicle computing system 106 may process audio data and classify a sound as an emergency sound 110 (e.g., siren) emitted by the emergency vehicle 104. In various examples, the classification of the sound as an emergency sound 110 may be based on a frequency and/or a volume associated therewith. In various examples, the frequency and/or volume may be based on the location associated with the vehicle 102. For example, a first vehicle 102 operating in a first country may be configured to determine the emergency sound 110 based on a first frequency and a first volume and a second vehicle operating in a second country may be configured to determine the emergency sound 110 based on a second frequency and a second volume.

In various examples, the EV detection and response component 108 may receive the indication of the emergency sound 110 and may determine, based at least in part on the emergency sound 110, that the emergency vehicle 104 is operating in the emergency state. In some examples, based on the emergency sound 110, the vehicle computing system 106 may determine that the emergency vehicle 104 is operating in the emergency state.

In some examples, the v EV detection and response component 108 may determine a direction of arrival associated with the emergency sound. In some examples, the EV detection and response component 108 may determine the direction of arrival based on techniques described in U.S. patent application Ser. No. 16/661,898, incorporated herein by reference above. In various examples, the vehicle computing system 106 (e.g., the EV detection and response component 108) may determine the emergency sound 110 and/or the direction of arrival based on one or more machine learned models. In such examples, the machine learned models may be trained based on training data including a plurality of emergency sounds 110 received from different directions (e.g., angular directions relative to the vehicle 102).

In various examples, the EV detection and response component 108 may determine the emergency state based on one or more actions associated with one or more objects 112 in the environment 100. In various examples, the actions may represent movement of the objects 112, such as object 112(1) and 112(2), in the environment 100. In the illustrative example, the actions may include a lane change action and/or a pull-over action. For example, the action associated with object 112(1) includes a lane change from a first lane 114 to a second lane 116 and a pull-over action toward a road shoulder 118. The action associated with the object 112(2) operating in the second lane 116 includes the pull-over action toward the road shoulder 118.

In various examples, actions associated with the objects 112 may be determined based on an expected trajectory 120 associated with an object 112 and an actual trajectory 122 associated with the objects 112. In various examples, the expected trajectory 120 may be determined based on one or more expectations of the objects 112 in the environment, such as to continue straight in a lane, perform a lane change to overtake another vehicle, or the like. In some examples, the expected trajectory 120 may be determined based on heuristics, historical observations of movement associated with the object, observations of other object 112 behaviors, and the like. In various examples, the expected trajectory 120 may be determined utilizing machine learning techniques. In such an example, the expected trajectory 120 may be output by a machine learned model trained based on training data including moving objects.

In various examples, the actual trajectory 122 may be determined based on at least one of a first location 124 and a second location 126 associated with the object 112. The first location 124 may include a location of a respective object at a first time and the second location 126 may include a location of the respective object at a second time. For example, the vehicle computing system 106 may determine, based on sensor data, that the first object 112(1) is at a first location 124(1) and the second object 112(2) is at a first location 124(2) at the first time and the first object 112(1) is at a second location 126(1) and the second object 112(2) is at a second location 126(2) at a second time. Based on the respective positions, the vehicle computing system 106 may determine the respective object trajectories 120(1) and 120(2).

In various examples, the EV detection and response component 108 may determine the emergency state based on a comparison of the actual trajectories 122 and the expected trajectories 120. In some examples, based on determination that an actual trajectory 122, such as actual trajectory 122(1) differs from an expected trajectory, such as expected trajectory 120(1) by a threshold amount, the EV detection and response component 108 may determine that actual trajectory 122(1) and associated action are indicative of the emergency state. The threshold may include a threshold change in speed, threshold change in direction, threshold distance from an expected route of travel, or any other difference in movement that indicates the object 112 is yielding to the emergency vehicle 104.

In various examples, the EV detection and response component 108 may determine the emergency state based on a determination that a threshold number (e.g., 1, 2, 5, etc.) or percentage (e.g., 100%, 75%, 50%, etc.) of objects 112 operating in the environment 100 are performing actions indicative of yielding to the emergency vehicle 104 (e.g., actual trajectory 122 differs the threshold amount from the expected trajectory 120). In various examples, the threshold number or percentage of objects 112 moving in the environment may represent a flow of traffic in the environment. In some examples, the flow of traffic may represent a general direction of movement out of a path of the emergency vehicle (e.g., out of the second lane 116) or in one or more directions (e.g., to the right and/or left). As will be discussed below, the EV detection and response component 108 may at least one of a yielding direction or a yielding location based in part on the flow of traffic.

In various examples, the EV detection and response component 108 may determine a probability that the emergency vehicle is operating in the emergency state. The probability may be based on the visual data, the audio data, and/or the actions associated with the object(s) 112 based on the trajectories 120 and 122. The probability may represent a confidence of the EV detection and response component 108 that the emergency vehicle 104 is operating in the emergency state. In various examples, based on a determination that the probability is below a threshold, a remote operations communication component 128 of the vehicle computing system 106 may determine to contact a remote computing device 130 for confirmation of the emergency state.

In various examples, the remote operations communication component 128 may send a request to the remote computing device 130 to connect via the network 132. The network 132 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the vehicle computing system 106 and the remote computing device(s) 130 may communicate with one another.

In some examples, the request may include a request to confirm the emergency state. In various examples, the vehicle operations component 134 may receive the request and a sensor data processing component 136 may process audio and/or visual data sent via the network 132. The audio and/or visual data may include raw data and/or processed data, such as that processed by the vehicle computing system 106. In some examples, the vehicle operations component 134 may be operated by a human operator configured to confirm the emergency state, based on the audio and/or visual data. In some examples, the vehicle operations component 134 may access audio and/or visual data processed by the sensor data processing component 136 and may determine whether to confirm the emergency state. In various examples, the vehicle operations component 134 (and/or a human associated therewith) may send an indication that the emergency vehicle 104 is or is not operating in the emergency state. The EV detection and response component 108 may receive the indication and determine whether to yield to the emergency vehicle 104 based at least in part on the indication.

In various examples, based on a determination that the probability meets or exceeds the threshold probability, the EV detection and response component 108 may determine whether the emergency vehicle 104 operating in the emergency state. In some examples, based on the determination that the emergency vehicle 104 is operating in the emergency state, the vehicle computing system may determine to yield to the emergency vehicle 104. In some examples, a determination to yield may be based on an indication to yield (e.g., an instruction to yield) received from the remote computing device 130. In such an example, the EV detection and response component 108 may cause the vehicle to yield responsive to the instruction received from the remote computing device 130. For example, a remote operator may determine based on received sensor data that an emergency vehicle 104 is operating in an emergency state in the environment 100. The remote operator may send an indication that the emergency vehicle 104 is operating in the emergency state and an instruction to yield to the emergency vehicle 104 (e.g., pull-over, stop forward movement, etc.). The EV detection and response component 108 may receive the instruction, such as through the remote operations communication component 128, and may cause the vehicle 102 to pull over onto the road shoulder 118.

In some examples, the determination to yield may be based on one or more locations and/or a predicted trajectory 138 associated with the emergency vehicle 104 operating in the emergency state. In some examples, the EV detection and response component 108 may determine the location(s) of the emergency vehicle over time and/or the predicted trajectory 138 associated therewith. The predicted trajectory 138 may represent a path of the emergency vehicle 104 through the environment. The EV detection and response component 108 may determine the predicted trajectory 138 based on techniques described in U.S. patent application Ser. Nos. 15/807,521, 16/151,607, and 16/504,147 incorporated herein by reference above. In various examples, the location(s) and/or the predicted trajectory 138 may provide an indication that the emergency vehicle 104 is approaching the vehicle 102. For an illustrative example, a location associated with emergency vehicle 104 includes a location in the second lane 116 behind the vehicle 102 and the predicted trajectory 138 includes the emergency vehicle 104 traveling toward the vehicle 102. Based on the location behind the vehicle, in a same lane 116 as the vehicle, and/or the predicted trajectory 138 traveling toward the vehicle 102, the EV detection and response component 108 may determine to yield to the emergency vehicle 104. Though this is merely an illustrative example and is not intended to be limiting. For example, the EV detection and response component 108 may determine to yield to an emergency vehicle 104 operating in the environment 100 regardless of the predicted trajectory 138 associated therewith.

In various examples, the determination to yield may be based on a determination that the emergency vehicle 104 and the vehicle 102 share (or will share at a future time based on the predicted trajectory) at least one of a driving lane, such as second lane 116, a direction of travel on a road, an intersection, a section of road, or the like. In various examples, the determination to yield may be based on one or more rules of the road (e.g., laws, regulations, etc. associated with operating in the environment). For example, the rule(s) of the road may require vehicles 102 to slow or stop forward movement and yield to an emergency vehicle 104 operating in an emergency state on the road within a threshold distance of a vehicle 102, such as regardless of a direction of travel of the emergency vehicle 104. Accordingly, the EV detection and response component 108 may determine to yield to a detected emergency vehicle 104 located on the road within the threshold distance.

Based at least in part on a determination to yield to the emergency vehicle 104, the EV detection and response component 108 may determine a yielding direction 140 (e.g., direction to move out of the emergency vehicle path), and/or a yielding location 142. The yielding direction 140 may include a direction in which the vehicle may legally travel on a drivable surface from a current position out of a path of the emergency vehicle 104. The yielding location 142 may include a location associated with the drivable surface that satisfies one or more conditions. The conditions may include that the yielding location 142 is located on a drivable surface, clear of objects, visible to the vehicle 102 (e.g., not occluded), and not associated with the path and/or predicted trajectory 138 of the emergency vehicle 104.

In various examples, the yielding direction 140 and/or yielding location 142 may be determined based on the instruction to yield from the remote computing device 130 (e.g., the remote operator). In such examples, the instruction may include one or more of the yielding direction 140 and the yielding location 142. For example, a remote operator may verify that conditions are satisfied with respect to the yielding location 142 and may send an instruction via the vehicle operations component 134 and to the remote operations communication component 128 to pull the vehicle 102 over to the right (yielding direction 140) and into the yielding location 142 on the road shoulder 118. Based on receipt of the instruction, the EV detection and response component 108 may cause the vehicle to be controlled toward the yielding location 142 and out of the path of the emergency vehicle 104.

In various examples, the EV detection and response component 108 may determine a lane, such as second lane 116 associated with the emergency vehicle 104. The second lane 116 associated with the emergency vehicle 104 may be based on the determined location(s) and/or predicted trajectory 138 associated therewith. In some examples, the EV detection and response component 108 may determine the yielding direction 140 and/or yielding location 142 based on the second lane 116 associated with the emergency vehicle 104. In such examples, the vehicle computing system may determine the second lane 116 in which the emergency vehicle is operating and may initiate movement away from the second lane 116, such as onto the shoulder 118. In some examples, the movement away from the second lane 116 may include moving to another lane proximate the lane, such as the first lane 114. In some examples, the movement may include moving across two or more lanes. In such examples, the movement may be incremental (e.g., one lane at a time) or continuous (e.g., continuous movement across the lanes).

In various examples, the EV detection and response component 108 may determine the yielding direction 140 and/or the yielding location 142 based on the actions associated with the objects 112, as described above. In some examples, the EV detection and response component 108 may determine that a threshold number and/or percentage of objects 112 operating in the environment 100 are moving in a particular direction (e.g., pulling over to the right). In such examples, the EV detection and response component 108 may determine the yielding direction 140 and/or yielding location 142 based on the movement in the particular direction. For example, the EV detection and response component 108 may determine that the objects 112(1) and 112(2) are pulling over to the right for an emergency vehicle 104. The EV detection and response component 108 may determine that the threshold percentage of objects 112 are moving to the right and may determine the yielding direction 140 based on the actions (e.g., movement) associated with the objects 112(1) and 112(2).

Based on a determination to yield, the yielding direction 140, and/or the yielding location 142, the vehicle computing system 106, such as a planning component thereof, may determine a yielding trajectory. In various examples, the yielding direction 140 may represent the yielding trajectory. In various examples, the yielding trajectory may represent a vehicle trajectory out of the path of the emergency vehicle 104. In some examples, the yielding trajectory may include a negative acceleration of the vehicle. In such examples, the vehicle computing system may control the vehicle to slow based on the yielding trajectory. In at least one example, the vehicle computing system may control the vehicle to a stopped position.

In various examples, the EV detection and response component 108 may monitor movement of the emergency vehicle 104 through the environment 100. In some examples, the EV detection and response component 108 may determine that one or more release criteria are satisfied.

The release criteria may represent condition(s) associated with a release of the vehicle 102 from the yielding location 142 and/or yielding trajectory (represented as yielding direction 140). The release criteria may include that the emergency vehicle 104 is at least a threshold distance away from the vehicle 102, is traveling away from the vehicle 102, is no longer in the emergency state, that actions associated with the other objects 112 are indicative of forward movement (e.g., objects 112 operating in the second lane 116 and/or the first lane 114), and the like. In some examples, the EV detection and response component 108 may determine that the release criteria are satisfied based on visual data and/or audio data received at a second time after a first time associated with a determination to yield. In some examples, the EV detection and response component 108 may determine the release criteria are satisfied based on an indication of release received from the remote computing device 130. In such an example, the vehicle operations component 134 and/or a remote operator associated therewith may determine that the release criteria are satisfied and may provide the indication of release to the vehicle. In various examples, the vehicle operations component 134 may include one or more machine learned models configured to determine whether the release criteria are satisfied.

In various examples, responsive to a determination or indication from the remote computing device 130 that the release criteria are satisfied, the EV detection and response component 108 may generate one or more vehicle trajectories from the yielding location 142 to a destination. In some examples, based on the determination or indication that the release criteria are satisfied, the EV detection and response component 108 may modify the yielding trajectory to the one or more vehicle trajectories. In some examples, the vehicle computing system 106 may control the vehicle according to the vehicle trajectories. For example, the vehicle 102 may yield to the emergency vehicle according to a yielding trajectory that causes the vehicle 102 to move toward the yielding location 142, such as represented by yielding direction 140. Prior to reaching the yielding location 142, the EV detection and response component 108 may determine that the release criteria are satisfied. The EV detection and response component 108 may modify the yielding trajectory into the vehicle trajectory associated with movement toward the destination.

FIG. 2A is an example process 200A for detecting and responding to an emergency vehicle 104, in accordance with examples of this disclosure. In at least one example, the process 200A may be performed by a vehicle computing system, such as vehicle computing system 106 of FIG. 1.

At operation 202, the process may include receiving sensor data associated with an environment in which a vehicle 102 operates. The sensor data may include visual data (e.g., image data, lidar data, radar data, etc.) and/or audio data captured by one or more sensors. The sensor data may be captured by one or more sensors associated with the vehicle, one or more sensors associated with other vehicles, and/or one or more sensors mounted in the environment.

At operation 204, the process may include determining, based at least in part on the sensor data, that an emergency vehicle 104 is operating in an emergency state. In various examples, the vehicle computing system may be configured to determine a semantic classification of detected objects in the environment. For example, the vehicle computing system may classify the objects 112(1) and 112(2) as cars and the emergency vehicle 104 as an emergency vehicle.

In various examples, the vehicle computing system may determine that the emergency vehicle is operating in the emergency state based on the visual data. In various examples, the vehicle computing system may determine, based at least in part on the visual data, that the detected object includes one or more flashing lights. In some examples, the flashing lights may include a lighting sequence indicative of an emergency state. In some examples, the vehicle computing system may be configured to determine a color (e.g., red, blue, amber, green, magenta, white, etc.) associated with the flashing light(s). In such examples, the vehicle computing system may determine the emergency state based in part on the color.

In various examples, the vehicle computing system may determine the classification of the emergency vehicle, the flashing light and/or lighting sequence, and/or the color associated with the emergency state based on one or more machine learned models. In such examples, the machine learned models may be trained based on training data comprising a plurality of emergency vehicles emitting lights indicative of an emergency state.

In various examples, the vehicle computing system may determine that the emergency vehicle is operating in the emergency state based on the audio data. In some examples, the audio data may include the sound 110. In various examples, the vehicle computing system may be configured to classify the sound 110 as an emergency sound, such as a siren. Based at least in part on the detection and classification of the sound 110 as the emergency sound, the vehicle computing system may determine that the emergency vehicle 104 is operating in the emergency state.

In various examples, the vehicle computing system may determine that the emergency vehicle 104 is operating in the emergency state based on one or more locations and/or actions associated with the objects 112(1) and 112(2). For example, as illustrated in FIG. 1, the objects 112(1) and 112(2) may be observed to pull over to the right into the second locations 126(1) and 126(2), respectively. Based on the movement of one or more of the objects 112(1) and/or 112(2) (e.g., flow of objects), the vehicle computing system may determine that the objects 112(1) and 112(2) are yielding to the vehicle operating in the emergency state.

In various examples, the vehicle computing system may receive an indication that the emergency vehicle 104 is operating in the emergency state, such as from a remote computing device. In some examples, the vehicle computing system may receive the indication responsive to a request to confirm whether the emergency vehicle 104 is operating in the emergency state. In some examples, the vehicle computing system may send the request based on a determination that a probability associated with a determination of the emergency state is at or below a threshold probability (e.g., confidence at or below a threshold).

At operation 206, the process may include determining, based at least in part on the sensor data at least one of a location 208 or a predicted trajectory 138 associated with the emergency vehicle 104. As discussed above, the predicted trajectory 138 may represent a predicted trajectory associated with the emergency vehicle 104. In some examples, the predicted trajectory 138 may represent a direction of travel and/or a velocity associated with the emergency vehicle 104. In some examples, the predicted trajectory 138 may be determined based on one or more locations of the emergency vehicle 104 over time. For example, the predicted trajectory 138 may be based in part on previous movement of the emergency vehicle (e.g., history of movement through the environment). In various examples, the predicted trajectory 138 may be determined based on a top-down representation of the environment, such as that described in the U.S. patent applications incorporated herein by reference above.

At operation 210, the process may include controlling the vehicle based at least in part on at least one of the location 208 or the predicted trajectory 138. In various examples, the vehicle computing system may determine, based on the location 208 and the predicted trajectory 138, that the emergency vehicle 104 is not relevant to the vehicle 102. In such examples, the emergency vehicle 104 may be irrelevant to the vehicle based on a determination that a location and/or predicted trajectory 138 of the emergency vehicle do not conflict with the vehicle. For example, based on a determination that the location 208 of the emergency vehicle 104 is behind the vehicle 102 and that the vehicle is stopped (e.g., velocity=0) or is driving away from the vehicle 102, the vehicle computing system may determine that the emergency vehicle is irrelevant to the vehicle 102. Based on a determination of irrelevance, the vehicle computing system may control the vehicle based on a continue on route trajectory 212.

Based on a determination that the emergency vehicle 104 is relevant to the vehicle 102 (e.g., that at least one of the location 208 or the predicted trajectory 138 conflicts with the vehicle 102, the vehicle computing system may determine a yielding trajectory 214. In various examples, the vehicle computing system may determine a yielding location that satisfies one or more conditions for yielding. The condition(s) may include that the yielding location is located on a drivable surface, clear of objects, visible to the vehicle (e.g., not occluded), and not associated with the path of the emergency vehicle 104 (e.g., based on the predicted trajectory 138).

In various examples, the vehicle computing system may determine the yielding trajectory 214 based on an initial location of the vehicle 102 associated with a determination to yield and the yielding location. In some examples, the vehicle computing system may determine a reference trajectory between the initial location and the yielding location. In various examples, the vehicle computing system may determine a corridor associated with the reference trajectory. In such examples, the corridor may represent a drivable surface extending a distance on either side of the reference trajectory. In some examples, the vehicle computing system may determine whether an object is located in the corridor. Based on a determination that an object is located in the corridor, the vehicle computing system may remove an area associated with the object from the corridor. Based on a determination that no object is located in the corridor, the vehicle computing system may determine the corridor comprises the entire area associated with the extended distance from the reference trajectory. In various examples, the vehicle computing system may apply an optimization algorithm, such as a differential dynamic programming algorithm, to the reference trajectory and/or the corridor. In such examples, the vehicle computing system may determine an optimized yielding trajectory 214.

In various examples, a determination to control the vehicle 102 based on the continue on route trajectory 212 or the yielding trajectory 214 may be based on a cost analysis. In such examples, the vehicle computing system may determine a first cost associated with the continue on route trajectory 212 and a second cost associated with the yielding trajectory 214. The cost may be based on safety (e.g., avoiding a collision between the vehicle and the object), comfort (e.g., lack of abrupt movements), progress (e.g., movement toward destination), operating rules (e.g., rules of the road, laws, codes, regulations, etc.), or the like, such as those described in U.S. patent application Ser. No. 16/539,928, filed Aug. 13, 2019 and entitled "Cost-Based Path Determination," the entire contents of which are incorporated herein by reference. In various examples, the vehicle computing system may control the vehicle based on the lowest cost trajectory (e.g., lowest cost action).

Figure 2B:
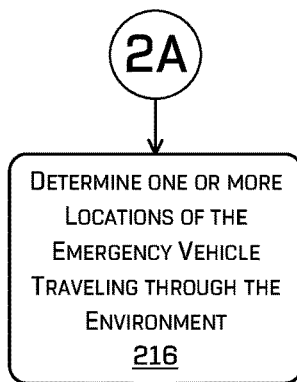
FIG. 2B is an example process for determining to proceed toward a destination after yielding to an emergency vehicle, in accordance with examples of this disclosure.
Figure 2B:
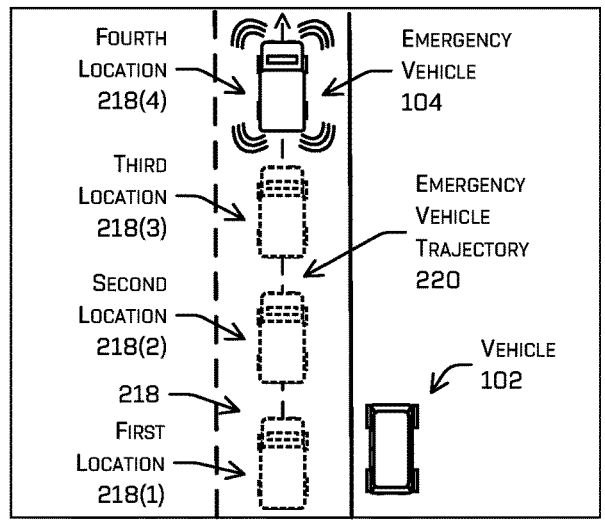
Figure 2B:
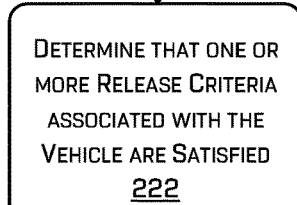
Figure 2B:
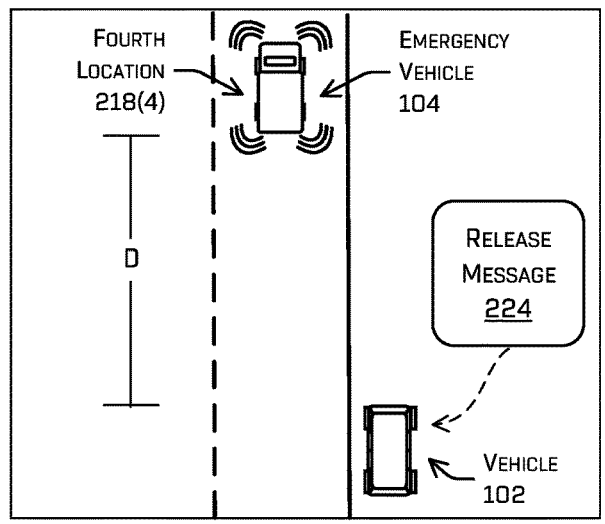
Figure 2B:
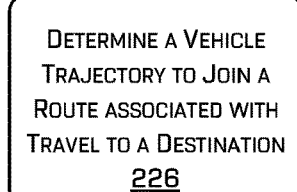
Figure 2B:
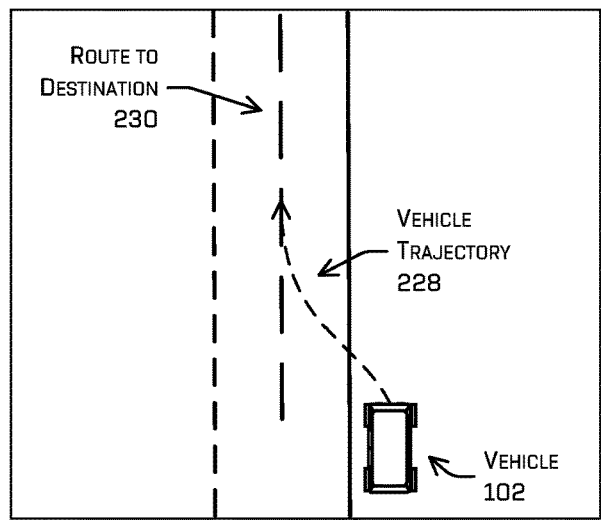
Figure 2B:
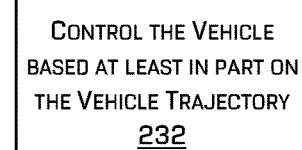

FIG. 2B is an example process 200B for determining to proceed toward a destination after yielding to an emergency vehicle 104, in accordance with examples of this disclosure.

At operation 216, the process may include determining one or more locations 218 of the emergency vehicle traveling through the environment. In various examples, the location(s) 218 may be determined based on sensor data. In some examples, each of the locations 218 may be associated with sensor data captured at a different time. For example, a first location 218(1) may be associated with sensor data captured at a first time, a second location 218(2) may be associated with sensor data captured at a second time, a third location 218(3) may be associated with sensor data captured at a third time, a fourth location 218(4) may be associated with sensor data captured at a fourth time. In various examples, the times may be associated with a periodic capture and/or processing of sensor data, such as every 0.1 seconds, 0.2 seconds, 1 second, or the like.

In various examples, the vehicle computing system may be configured to determine an actual emergency vehicle trajectory 220 based on the locations 218. The actual emergency vehicle trajectory may represent an actual movement of the emergency vehicle 104 through the environment.

At operation 222, the process may include determining that one or more release criteria associated with the vehicle 102 are satisfied. In some examples, the vehicle computing system may determine that the release criteria are satisfied based on visual data and/or audio data. The release criteria may represent criteria associated with the vehicle 102 release from the yielding location and/or yielding trajectory. In some examples, the release criteria may include that the emergency vehicle 104 is at least a threshold distance (D) away from the vehicle 102. In the illustrative example, the fourth location 218(4) may include a location that is located the threshold distance (D) from the vehicle 102. In such an example, based on a determination that the emergency vehicle 104 is located at the fourth location 218(4), the vehicle computing system may determine that the release criterion associated with the threshold distance (D) is met. Though this is merely for an illustrative example, and any other location (the first location 218(1), the second location 218(2), and/or the third location 218(3) may be associated with the threshold distance (D).

In some examples, the release criteria may include that the actual emergency vehicle trajectory 220 includes a direction of travel away from the vehicle 102 and/or includes a velocity greater than zero. In some examples, the release criteria may be satisfied based on a determination that the emergency vehicle is no longer operating in the emergency state. In such examples, the vehicle computing system may determine based on audio, visual data and/or an indication from a remote computing device, that the emergency vehicle is not operating in the emergency state (e.g., siren stopped, lights turned off, emergency vehicle 104 is proceeding according to rules of the road and/or a speed limit, etc.).

In some examples, the vehicle computing system may determine that the release criteria associated with the vehicle 102 are satisfied based on a determination of actions associated with the other objects. For example, the vehicle computing system may determine that the objects 112(1) and 112(2) depicted in FIG. 2A (but not shown in 2B) have started movement from the second location 126(1) and 126(2), respectively. In such examples, the movement of the objects 112(1) and 112(2) in the environment may be indicative of the emergency vehicle 104 no longer being relevant to the vehicle 102.

In some examples, the vehicle computing system may determine the release criteria are satisfied based on an indication of release received from the remote computing device, such as remote computing device 130 of FIG. 1. In various examples the indication of release may be provided in a release message 224 received from the remote computing device, such as via a remote operator. In some examples, the release message 224 may indicate that the emergency vehicle 104 is no longer relevant to the vehicle 102 and that the vehicle may proceed toward a destination.

At operation 226, the process may include determining a vehicle trajectory 228 to join a route 230 associated with travel to a destination. In some examples, the vehicle computing system may determine the route 230 based on the yielding location. In some examples, the route 230 may be associated with a route structure, such as that associated with one or more maps stored on the vehicle 102 or otherwise accessible to the vehicle 102 (e.g., stored on a remote computing device). In some examples, the vehicle computing system may determine a route return location associated with rejoining the route 230. In some examples, the route return location may be associated with a lateral distance from the route to the vehicle 102 and a heading error associated with a heading of the vehicle 102. The heading error may include an angular difference between the heading of the vehicle 102 and a direction associated with the route 230.

At operation 232, the process may include controlling the vehicle based at least in part on the vehicle trajectory 228. In various examples, the vehicle computing system may control the vehicle to the destination based at least in part on the route 230.

Figure 3:
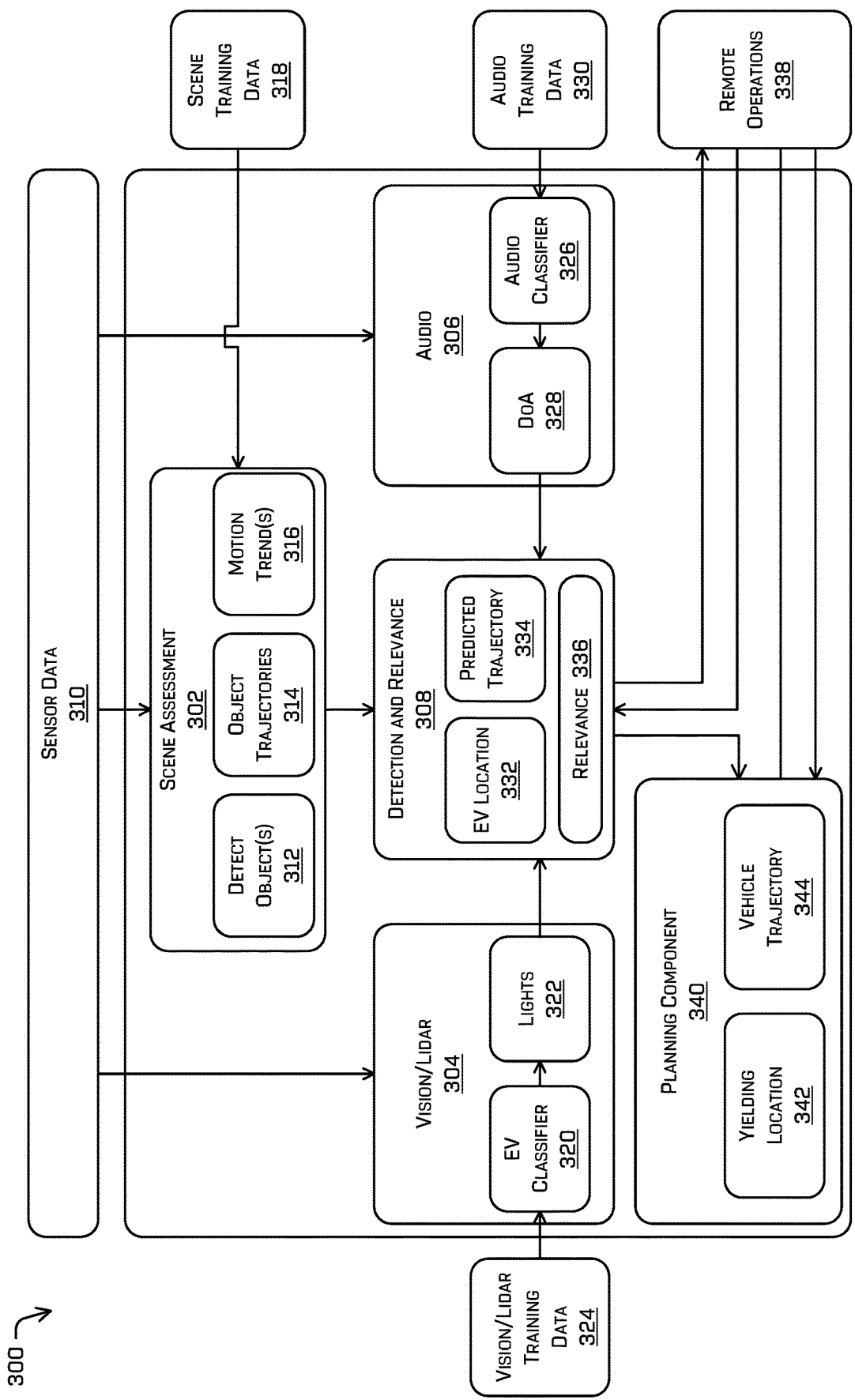
FIG. 3 depicts a block diagram of example components of an emergency vehicle detection and response system, in accordance with examples of the disclosure.

FIG. 3 depicts a block diagram 300 of example components of an emergency vehicle detection and response system, in accordance with examples of the disclosure. In various examples, the emergency vehicle detection and response system may include a scene assessment component 302, a vision/lidar component 304, an audio component 306, and a detection and relevance component 308. In various examples, the scene assessment component 302, a vision/lidar component 304, an audio component 306, and a detection and relevance component 308 may include subcomponents of an emergency vehicle detection and relevance component, such as EV detection and relevance component 108.

In various examples, the scene assessment component 302 may receive sensor data 310 from one or more sensors. In some examples, the sensor data may include raw sensor data from the sensor(s). In some examples, the sensor data may include processed sensor data, such as that processed by a perception component of the vehicle computing system. In some examples the processed sensor data may comprise data based on the raw sensor data.

In various examples, the sensor data 310 received by the scene assessment component may include lidar data, image data, radar data, sonar data, time-of-flight data, audio data, and the like. In various examples, the scene assessment component 302 may be configured to detect objects at object detection component 312. The object detection component 312 may determine a semantic classification of one or more objects, such as a classification as a car, truck, pedestrian, bicyclist, motorcycle, or the like. In various examples, the scene assessment component 302 may include an object trajectory component 314. The object trajectory component may be configured to determine one or more expected trajectories associated with the objects, such as expected trajectories 120 of FIG. 1. In some examples, the object trajectory component 314 may be configured to determine one or more actual trajectories associated with the detected objects, such as actual trajectories 122 of FIG. 1.

In some examples, a motion trend component 316 may determine one or more motion trends associated with the objects. In some examples, the motion trend(s) may include a flow of traffic in a particular direction or in one or more directions. In some examples, the motion trend(s) may include a trend of vehicles to move away from a particular driving lane, such as a driving lane in which an emergency vehicle is operating. In various examples, the motion trend(s) may be determined based in part on a comparison of the expected trajectories to the actual trajectories associated with the objects. In some examples, the motion trend(s) may be determined based on the actual movement and/or actual stopping (e.g., yielding) locations associated with the detected objects.

In various examples, the scene assessment component 302 may include one or more neural networks configured to determine at least one of a classification of an object, an expected object trajectory, and/or motion trend(s) associated with detected objects. In some examples, the neural network(s) may be trained to output the classification, the expected object trajectory and/or the motion trend(s) based on scene training data 318. The scene training data may include a plurality of environments including multiple objects and movements thereof with and without emergency vehicle interaction. In at least one example, the scene training data may include a plurality of object reactions to emergency vehicles operating in an emergency state. In some examples, the motion trend(s) component 316 may be trained to determine a threshold number or percentage of objects that move responsive to an emergency vehicle that is indicative of the emergency vehicle operating in the emergency state.

In various examples, based on a determination that the threshold number or percentage of objects in the environment are moving and/or have moved in a particular direction and/or away from an area (e.g., away from a particular driving lane), the motion trend(s) component 316 may determine that an emergency vehicle may be operating in an emergency state in the environment. In various examples, scene assessment component 302 may provide data associated with the motion trend(s) to the detection and relevance component 308, such as a direction of travel, percentages of objects moving in particular directions, a direction of movement associated with one or more objects operating closest to the vehicle, a direction of movement associated with one or more objects operating in a same lane as the vehicle.

Additionally, the detection and relevance component 308 may receive data from the vision/lidar component 304 and the audio component 306. In various examples, the vision/lidar component 304 may receive sensor data 310 including vision (e.g., image data) and/or lidar data. An emergency vehicle classifier 320 may be configured to perform a semantic classification on the vision and/or lidar data to determine whether an object is an emergency vehicle. The emergency vehicle may include a police vehicle (e.g., police car, prison transport vehicle, motorcycle, etc.), a fire vehicle (e.g., fire engine, fire chief vehicle, etc.), an ambulance, or any other vehicle configured to provide emergency services.

In various examples, the vision/lidar component 304 may include a lights component 322 configured to determine whether the emergency vehicle classified as such by the emergency vehicle classifier 320 is operating in the emergency state. In various examples, the emergency state may be determined based on a detection of one or more flashing lights. In some examples, the emergency state may be determined based on a detection of a sequence of flashing lights. For example, alternating left and right lights may indicate an emergency state of an emergency vehicle. In various examples, the emergency state may be determined based on a color associated with the lights. In such examples, the color may include red, blue, amber, green, magenta, white, and/or any other color indicative of an emergency state.

In various examples, the vision lidar component 304, the emergency vehicle classifier 320 and/or the lights component 322 may include one or more neural networks configured to output a probability associated with the emergency state of the emergency vehicle, based on the vision and/or lidar data. In some examples, the neural network(s) may be trained based on vision/lidar training data 324 including one or more images and/or lidar data indicative of a plurality of emergency vehicles operating in the emergency state. In various examples, the vision/lidar component 304 may provide the probability associated with the emergency state (determined by the neural network(s)) to the detection and relevance component 308. In some examples, the vision/lidar component 304 may provide a determination regarding the emergency state and/or a confidence associated therewith to the detection and relevance component 308. In some examples, the vision/lidar component 304 may provide the classification and/or lighting data (e.g., flash, sequence, color, etc.) to the detection and relevance component 308.

In various examples, the audio component 306 may receive sensor data 310 including audio data (e.g., one or more sounds). In some examples, an audio classifier 326 may be configured to classify a detected sound as an emergency sound (e.g., a siren). In some examples, the audio component may include a direction of arrival (DoA) component 328 configured to determine a direction of arrival of a sound. In some examples, the DoA component 328 may receive an indication of an emergency sound from the audio classifier 326 and may determine the direction of arrival based on the indication of the emergency sound. In various examples, the DoA may utilize the techniques described in U.S. patent application Ser. No. 16/661,898, incorporated by reference herein above.

In various examples, the audio component 306, the audio classifier 326 and/or the DoA component 328 may include one or more neural networks configured to output a probability associated with the emergency state of the emergency vehicle, based on the audio data. In some examples, the neural network(s) may be trained based on audio training data 330 including audio data indicative of a plurality of emergency vehicles operating in the emergency state. In various examples, the audio component 306 may provide the probability associated with the emergency state (determined by the neural network(s)) to the detection and relevance component 308. In some examples, the audio component 306 may provide a determination regarding the emergency state and/or a confidence associated therewith to the detection and relevance component 308. In various examples, the audio component 306 may provide the direction of arrival of the emergency sound to the detection and relevance component 308.

In various examples, based on data received from the scene assessment component 302, the vision/lidar component 304, and/or the audio component 306, an emergency vehicle location component 332 may be configured to determine a location of the emergency vehicle in the environment. In various examples, a trajectory component 334 may be configured to determine a predicted trajectory, such as predicted trajectory 138 of FIG. 1, associated with the emergency vehicle.

In various examples, a relevance component 336 may determine whether the emergency vehicle is relevant to the vehicle. In some examples, the emergency vehicle may be relevant based on a determination that the vehicle is operating in an emergency state. In some examples, the relevance component 336 may determine that the emergency vehicle is relevant based on a likelihood that the emergency vehicle may impact motion of the vehicle. In such examples, the emergency vehicle may impact the motion of the vehicle based on a determination to yield to the emergency vehicle. In some examples, the likelihood may be based on one or more indicators of an emergency state, such as a detected emergency sound, direction of arrival thereof, flashing lights, traffic flow (e.g., movement of one or more objects in the environment), and the like.

In some examples, the relevance component 336 may determine a probability that the vehicle is operating in the emergency state based on the data provided by the scene assessment component 302, the vision/lidar component 304, and/or the audio component 306. Based on a determination that the probability meets or exceeds a threshold, the relevance component 336 may determine that the emergency vehicle is operating in the emergency state.

In various examples, based on a determination that the probability is at or below the threshold, the relevance component 336 may send a request to confirm the emergency state to a remote operations component 338 associated with a remote computing device, such as remote computing device 130. In some examples, the relevance component 336 may receive a response from the remote operations component confirming or denying the emergency state. In some examples, responsive to receiving a response including an indication that the emergency vehicle is not operating in the emergency state, the vehicle may continue along a route toward a destination (e.g., no yield to the emergency vehicle). In some examples, responsive to receiving a response including an indication that the emergency vehicle is operating in the emergency state, the relevance component 336 may confirm the emergency state.

In various examples, based on the emergency vehicle location, the predicted trajectory associated therewith, and/or the determination of the emergency state, the relevance component 336 may determine that the emergency vehicle is relevant to the vehicle. In some examples a determination of relevance may indicate that the vehicle will yield to the emergency vehicle. In various examples, the relevance may be further based at least in part on one or more laws and/or regulations associated with operating in the environment and/or interactions with emergency vehicles.

In various examples, the detection and relevance component 308 may provide the relevance determination, the emergency state, emergency vehicle location and/or the predicted trajectory associated therewith to a planning component 340. In some examples, a yielding location component 342 of the planning component 340 may be configured to determine a yielding location associated with a vehicle movement out of the path of the emergency vehicle operating in the emergency state.

In some examples, the yielding location component 342 may receive an indication of the yielding location from the remote operations component 338. For example, a remote operator associated with the remote operations component 338 may send an indication of the yielding location to the yielding location component 342. In some examples, the yielding location component 342 may be configured to determine the yielding location based on motion trends, such as those determined by motion trends component 316. In such examples, the yielding location component 342 may determine a location based on a direction in which one or more other objects in the environment have moved out of the path of the vehicle.

In various examples, the yielding location component 342 may determine the yielding location based on a determination that a location outside of the path of the emergency vehicle satisfies one or more conditions. The conditions may include that the yielding location is located on a drivable surface, clear of objects, visible to the vehicle (e.g., not occluded), and is not associated with the path of the emergency vehicle. In various examples, the yielding location component 342 may determine one or more yielding locations incrementally. For example, the yielding location component 342 may determine to perform a lane change to the right to exit a lane associated with the emergency vehicle. The yielding location component 342 may determine a first yielding location in the right lane to navigate to in an initial yielding motion (e.g., yielding trajectory determined by a vehicle trajectory component 344). In some examples, the yielding location component 342 may determine a second yielding location on a road shoulder to navigate to in a follow-on yielding motion. The follow-on yielding motion may include a decrease in velocity to a stopped position. Accordingly, the vehicle may incrementally move across a road (e.g., across multiple lanes) to a final yielding position (e.g., stopped position). In some examples, the vehicle may not end up stopping at the final yielding position. For example, the vehicle may determine, prior to reaching the final yielding position, that the emergency vehicle is no longer relevant to the vehicle. Based on a determination of relevance, a vehicle trajectory component 344 may determine a trajectory associated with navigating to a destination and the planning component 340 may smoothly transition from a yielding trajectory to the trajectory associated with navigating to the destination.

In various examples, based in part on the yielding location, a vehicle trajectory component 344 may determine one or more yielding trajectories (e.g., yielding motions). In some examples, the yielding trajectory may be associated with vehicle movement out of the path of the emergency vehicle. In some examples, the yielding trajectories may include one or more directions of travel and/or one or more speeds associated with the vehicle. In some examples, the yielding trajectory may be determined based on input provided y the remote operations component 338. For example, one or more waypoints may be received from the remote operations component 338. Based on the waypoint(s), the vehicle trajectory component 344 may determine one or more yielding trajectories.

As discussed above, the yielding trajectories may be determined based on a reference trajectory from an initial location associated with the vehicle to a yielding location. In some examples, the reference trajectory may be determined based on a cubic spline curve, a Bezier curve, a series of clothoids, or the like. In various examples, the vehicle trajectory component may determine a corridor around the reference trajectory. The corridor may include an area around the reference trajectory that is unoccupied by objects (e.g., static or dynamic objects). The corridor may represent a drivable surface over which the vehicle may travel to the yielding location. In various examples, the vehicle trajectory component 344 may apply an optimization algorithm to the reference trajectory and/or the corridor. In at least one example, the optimization algorithm may include a differential dynamic programming algorithm, though this is merely an illustrative example, and any other algorithm may be used to optimize the yielding trajectory.

In various examples, the detection and relevance component 308 may be configured to determine, based on data received from the scene assessment component 302, the vision/lidar component 304, and/or the audio component 306, and/or the remote operations component 338, that the emergency vehicle is no longer relevant to the vehicle. In various examples, the determination of irrelevance may be based on a determination that one or more release criteria are satisfied. In some examples, a determination of irrelevance may be based on a location associated with the emergency vehicle being equal to or greater than a threshold distance. In some examples, a determination of irrelevance may be based on a trajectory associated with the emergency vehicle being indicative of the emergency vehicle moving away from the vehicle. In some examples, the determination of irrelevance may be based on a motion trend associated with objects in the environment proceeding on the road. In such examples, the motion trend may be indicative of the objects ceasing the yielding action. In various examples, the motion trend(s) component 316 may be additionally trained, such as based on machine learning techniques, to determine a trend of the objects proceeding along a road from a yielding position.

In various examples, the determination of irrelevance may be based on an indication of irrelevance received from the remote operations component 338. In such examples, the remote operations component 338 may provide a release message to the detection and relevance component 308 and/or the planning component 340. Responsive to receiving the release message and/or determining that the release criteria are satisfied (e.g., emergency vehicle is no longer relevant to the vehicle), the vehicle trajectory component 344 may determine a vehicle trajectory associated with the vehicle operating toward a destination.

Figure 4:
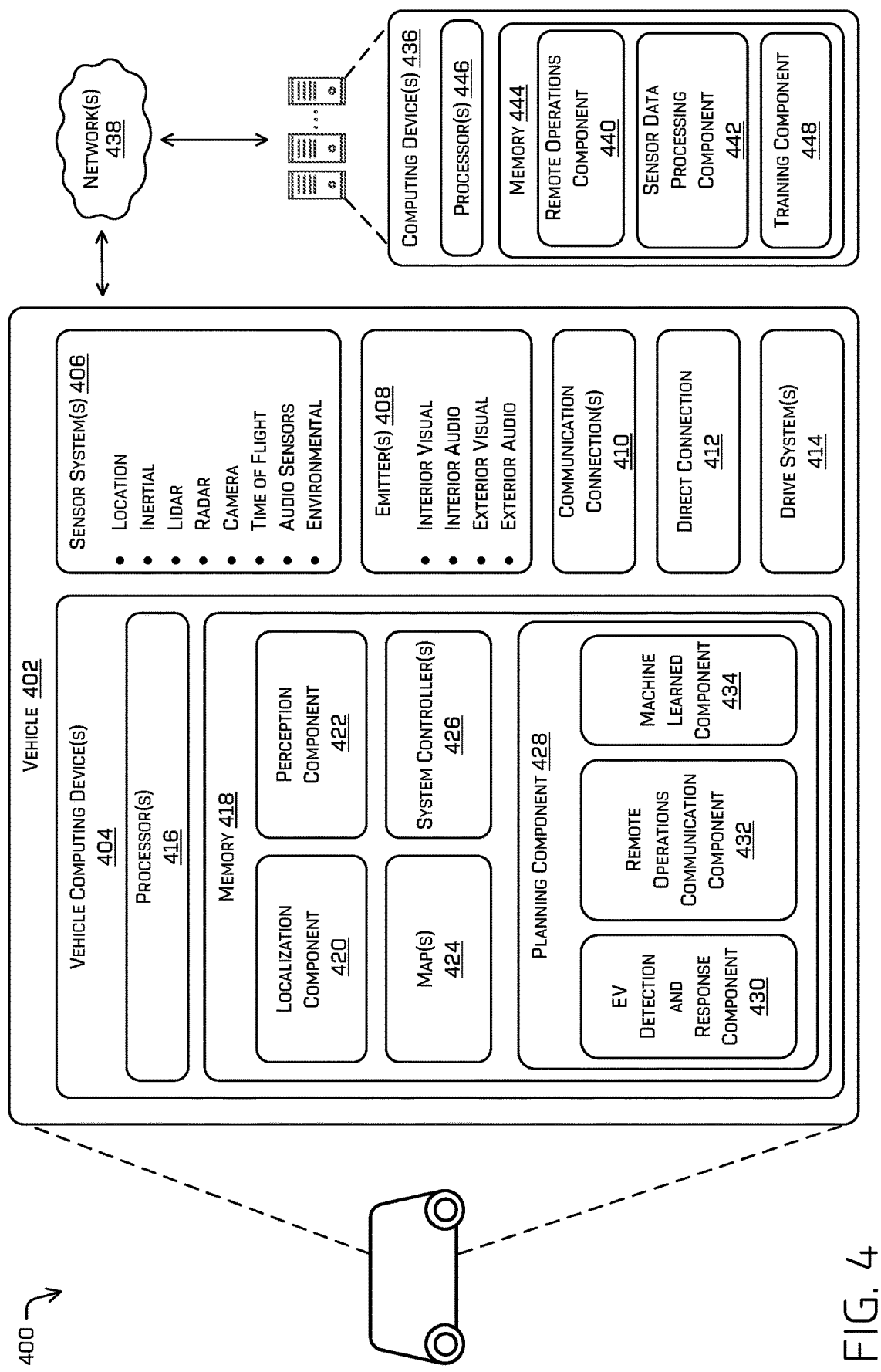
FIG. 4 depicts a block diagram of an example system for implementing the techniques described herein.

FIG. 4 depicts a block diagram 400 of an example system for implementing the techniques described herein. The vehicle 402 may include one or more vehicle computing devices 404 (also referred to as a vehicle computing device 404 or vehicle computing device(s) 404), such as vehicle computing system 106, one or more sensor systems 406, one or more emitters 408, one or more communication connections 410, at least one direct connection 412, and one or more drive systems 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle. In the illustrated example, the memory 418 of the vehicle computing device 404 stores a localization component 420, a perception component 422, one or more maps 424, one or more system controllers 426, and a planning component 428 including an emergency detection and response component 430, such as EV detection and response component 108, a remote operations component 432, such as remote operations component 128, and a machine learned component 434. Though depicted in FIG. 4 as residing in memory 418 for illustrative purposes, it is contemplated that the localization component 420, a perception component 422, one or more maps 424, one or more system controllers 426, and a planning component 428 including an emergency detection and response component 430, such as EV detection and response component 108, a remote operations component 432, such as remote operations component 128, and a machine learned component 434 may additionally, or alternatively, be accessible to the vehicle 402 (e.g., stored remotely).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for generating a trajectory and/or for generating or receiving map data, as discussed herein.

In some instances, the perception component 422 may include functionality to perform object detection, segmentation, and/or classification. In some examples, the perception component 422 may provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional or alternative examples, the perception component 422 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 418 may further include one or more maps 424 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 424 may include at least one map (e.g., images and/or a mesh). In some examples, the vehicle 402 may be controlled based at least in part on the map(s) 424. In some examples, the one or more maps 424 may be stored on a remote computing device(s) (such as the computing device(s) 436) accessible via network(s) 438. In some examples, multiple maps 424 may be stored based on, for example, a characteristic (e.g., type of entity, time of day, day of week, season of the year, etc.). Storing multiple maps 424 may have similar memory requirements but increase the speed at which data in a map may be accessed.

In at least one example, the vehicle computing device 404 may include one or more system controllers 426, which may be configured to control steering, propulsion, braking, safety, emitters, communication, and other systems of the vehicle 402. These system controller(s) 426 may communicate with and/or control corresponding systems of the drive system(s) 414 and/or other components of the vehicle 402.

In some examples, the planning component 428 may include an emergency vehicle (EV) detection and response component 430. As discussed herein, the EV detection and response component 430 may determine the emergency state based on visual data (e.g., image data captured by one or more cameras, lidar data, radar data, etc.) and/or audio data. In various examples, the EV detection and response component 430 may the emergency state based on one or more lights associated with the emergency vehicle (e.g., flashing, a flashing sequence, a color associated therewith, etc.). In some examples, the EV detection and response component 430 may determine the emergency state based on a detected sound and a classification thereof as an emergency sound (e.g., a siren). In some examples, a sound may be classified as an emergency sound based on a frequency and/or volume associated therewith. In various examples, the EV detection and response component 430 may determine the emergency state and/or a relevance of the emergency vehicle based on a direction of arrival associated with an emergency sound.

In various the EV detection and response component 430 may determine the emergency state based on one or more actions associated with one or more objects detected in the environment, such as those detected by the perception component 422. In various examples, the actions may represent movement of the objects in the environment. For example, the actions may include one or more lane changes and/or pulling over, such as to a shoulder of a road or other place outside of a path of an emergency vehicle.

In various the EV detection and response component 430 may determine one or more yielding locations and/or yielding trajectories associated with the vehicle yielding to the emergency vehicle in the emergency state, as described herein. In various examples, the EV detection and response component 430 may be configured to determine that one or more release criteria are satisfied. Based on the release criteria being satisfied, the EV detection and response component 430 may determine one or more trajectories to navigate the vehicle through the environment from the yielding location or a current location, such as if the vehicle does not stop, to a destination.

In various examples, a remote operations communication component 432 may be configured to connect with a remote operations component 440 (e.g., vehicle operations component 134 of FIG. 1) associated with the remote computing device(s) 436, such as via the network(s) 438, such as network 132. In some examples, the remote operations communication component 432 may connect with the remote operations component 440 based on a determination that a probability (e.g., confidence) associated with the determination that the emergency vehicle is operating in the emergency state is at or below a threshold probability. In such examples, based on a confidence being at or below a threshold, the remote operations communication component 432 may request confirmation of the emergency state from the remote operations component 440. In various examples, responsive to sending the request, the remote operations communication component 432 may receive, from the remote operations component 440 a determination of the emergency state. In at least one example, a human operator may determine the emergency state based on sensor data received by the sensor data processing component 442. In such an example, the human operator may send an indication of the emergency state to the remote operations communication component 432 and/or the EV detection and response component 430.

In various examples, the remote operations communication component 432 may additionally be configured to receive instructions associated with vehicle movement, such as a yielding location, one or more waypoints indicative of a yielding trajectory, the yielding trajectory itself, and the like. In some examples, the instructions may include a release instruction, such as an instruction releasing the vehicle from a yielding position after emergency vehicle passage.

In some examples, the planning component 428 may further comprise a machine learned component 434 (also referred to as a machine learned model component 434), which may include functionality to receive one or more features associated with the visual data and/or audio data and determine a probability that an emergency vehicle is operating in an emergency state (e.g., classify an object as an emergency vehicle, classify a light as indicative of an emergency state, classify a sound as an emergency sound, generate a DoA value, determine motion trends associated with objects, etc.) determine release criteria, and the like, as discussed herein.

In some instances, aspects of some or all of the components discussed herein may include any models, algorithms, and/or machine learning algorithms. For example, in some instances, the components in the memory 418 (and the memory 444, discussed below) may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or alternatively, the sensor system(s) 406 may send sensor data, via the one or more networks 438, to the one or more computing device(s) at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connection(s) 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., other nearby vehicles, traffic signals, etc.). The communications connection(s) 410 also enable the vehicle 402 to communicate with a remote teleoperation computing device or other remote services.

The communications connection(s) 410 may include physical and/or logical interfaces for connecting the vehicle computing device 404 to another computing device or a network, such as network(s) 438. For example, the communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In some examples, the vehicle 402 may send sensor data to one or more computing device(s) 436 via the network(s) 438. In some examples, the vehicle 402 may send raw sensor data to the computing device(s) 438. In other examples, the vehicle 402 may send processed sensor data and/or representations of sensor data to the computing device(s) 436. In some examples, the vehicle 402 may send sensor data to the computing device(s) 436 at a particular frequency, after a lapse of a predetermined period of time, in near real-time, etc. In some cases, the vehicle 402 may send sensor data (raw or processed) to the computing device(s) 436 as one or more log files.

The computing device(s) 436 may include processor(s) 446 and a memory 444 storing a training component 448.

In some instances, the training component 448 may include functionality to train a machine learning model to determine a probability that an emergency vehicle is operating in an emergency state (e.g., classify an object as an emergency vehicle, classify a light as indicative of an emergency state, classify a sound as an emergency sound, generate a DoA value, determine motion trends associated with objects, etc.) determine release criteria, and the like, as discussed herein.

In some examples, the training component 448 may include training data that has been generated by a simulator. For example, simulated training data may represent examples where testing audio sources in an environment, to provide additional training examples.

The processor(s) 416 of the vehicle 402 and the processor(s) 446 of the computing device(s) 436 may be any suitable processor capable of executing instructions to process data and perform operations as described herein. By way of example and not limitation, the processor(s) 416 and 446 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 444 are examples of non-transitory computer-readable media. The memory 418 and 444 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 444 may include at least a working memory and a storage memory. For example, the working memory may be a high-speed memory of limited capacity (e.g., cache memory) that is used for storing data to be operated on by the processor(s) 416 and 446. In some instances, the memory 418 and 444 may include a storage memory that may be a lower-speed memory of relatively large capacity that is used for long-term storage of data. In some cases, the processor(s) 416 and 446 may not operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

FIGS. 2A, 2B, and 5-7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 5:
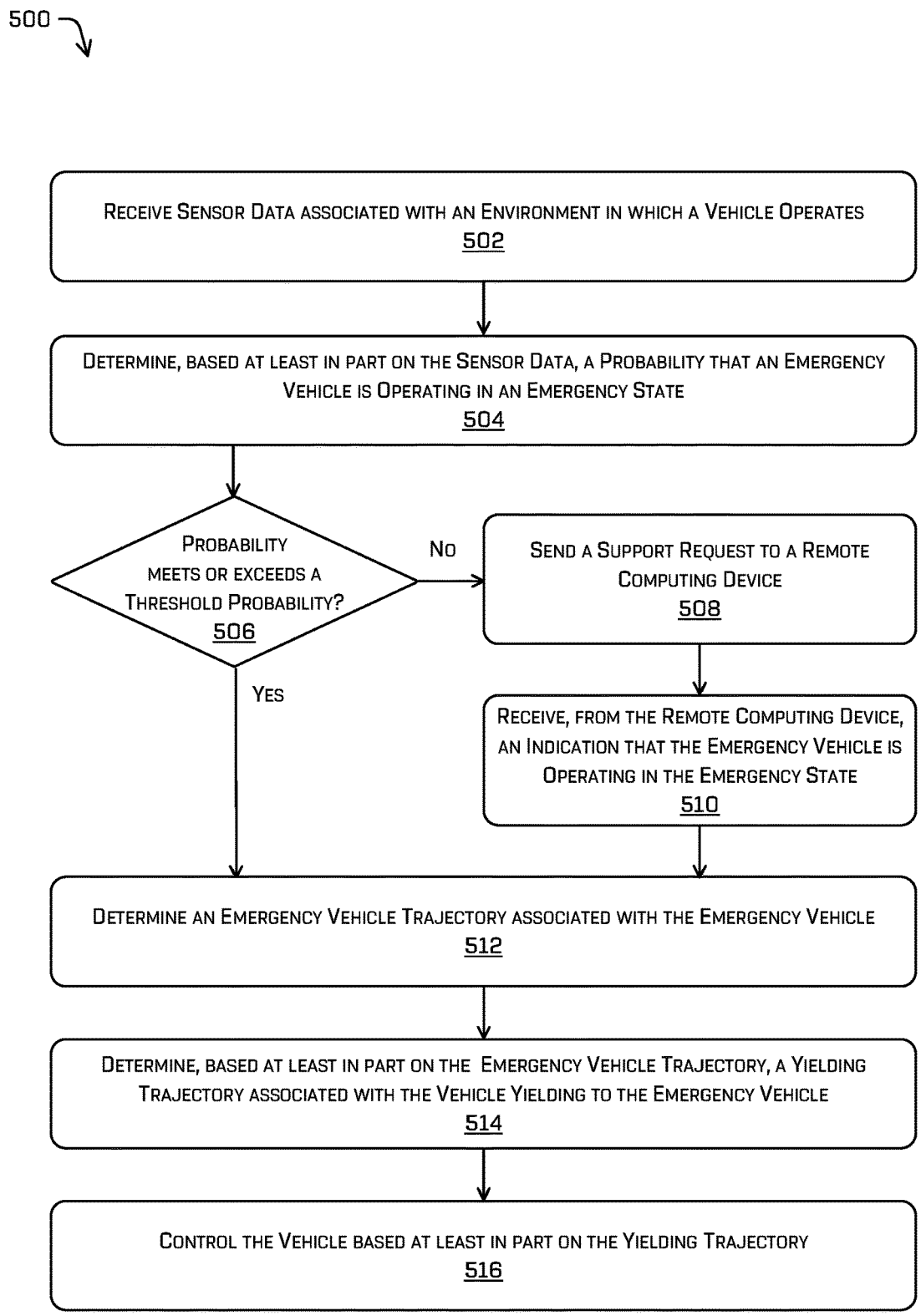
FIG. 5 depicts an example process for determining to yield to an emergency vehicle and controlling a vehicle based on a yielding trajectory, in accordance with examples of the disclosure.

FIG. 5 depicts an example process 500 for determining to yield to an emergency vehicle and controlling a vehicle based on a yielding trajectory, in accordance with examples of the disclosure. Some or all of the process 500 may be performed by one or more components in FIG. 4, as described herein. For example, some or all of the process 500 may be performed by the vehicle computing device(s) 404 and/or computing device(s) 436.

At operation 502, the process may include receiving sensor data associated with an environment in which a vehicle operates. The sensor data may include image data, lidar data, radar data, audio data, and the like. In some examples, the sensor data may be captured by one or more sensors associated with a vehicle, and/or one or more remote sensors, such as sensors associated with one or more other vehicles and/or one or more sensors mounted in the environment.

At operation 504, the process may include determining, based at least in part on the sensor data, a probability that an emergency vehicle is operating in an emergency state. The probability may be determined based on a visual classification of the emergency vehicle and/or a light associated therewith (e.g., flashing light, lighting sequence, color of the light), an audio classification of a sound as an emergency sound, a direction of arrival associated with the emergency sound, determined actions of other objects in the environment (e.g., flow of traffic, motion trend of objects), and the like, as described herein.

At operation 504, the process may include determining whether the probability meets or exceeds a threshold probability. The threshold probability may represent a confidence at which the vehicle computing system may operate without additional input with regard to the emergency state.

Based on a determination that the probability does not meet or exceed the threshold probability ("No" at operation 506), the process, at operation 508, may include sending a support request to a remote computing device. In some examples, the support request may include a request to confirm the emergency state. In some examples, the vehicle computing system may additionally send raw sensor data and/or data based on the raw sensor data (e.g., processed data). The sensor data may include at least visual and/or audio data.

At operation 510, the process may include receiving, from the remote computing device, an indication that the emergency vehicle is operating in emergency state. In various examples, the indication may be determined by a human operator associated with the remote computing device, based on the sensor data. In some examples, the remote computing device may be configured to determine the emergency state based on the sensor data, such as based on additional computing resources available thereto.

Based on a determination that the probability meets or exceeds the threshold probability ("Yes" at operation 506), the process, at operation 512, may include determining an emergency vehicle trajectory associated with the emergency vehicle. In some examples, the vehicle computing system may determine the emergency vehicle trajectory based on the indication that the emergency vehicle is operating in the emergency state.

In various examples, the emergency vehicle trajectory may represent a direction of travel and/or a velocity associated with the emergency vehicle through the environment. In some examples, the emergency vehicle trajectory may be determined based on one or more locations of the emergency vehicle over time. For example, the emergency vehicle trajectory may be based in part on previous movement of the emergency vehicle (e.g., history of movement through the environment). In various examples, the emergency vehicle trajectory may be determined based on a top-down representation of the environment, such as that described in the U.S. patent applications incorporated herein by reference above.

At operation 514, the process may include determining, based at least in part on the emergency vehicle trajectory, a yielding trajectory associated with the vehicle yielding to the emergency vehicle. In various examples, the yielding trajectory may represent a movement of the vehicle out of a path of the emergency vehicle. In some examples, the vehicle computing system may determine a yielding location that satisfies one or more conditions for yielding, such as those enumerated above. In some examples, the vehicle trajectory may include a trajectory from an initial location of the vehicle toward the yielding location, such as based on an optimization of a reference trajectory and/or a corridor, as described herein.

At operation 516, the process may include controlling the vehicle based at least in part on the yielding trajectory. In various examples, the vehicle computing system may control the vehicle out of the path of the emergency vehicle, such as in a pull over action, a lane change action, a yielding action, a slowing action, a stopping action, a turning action, or other action associated with yielding to an emergency vehicle.

Figure 6:
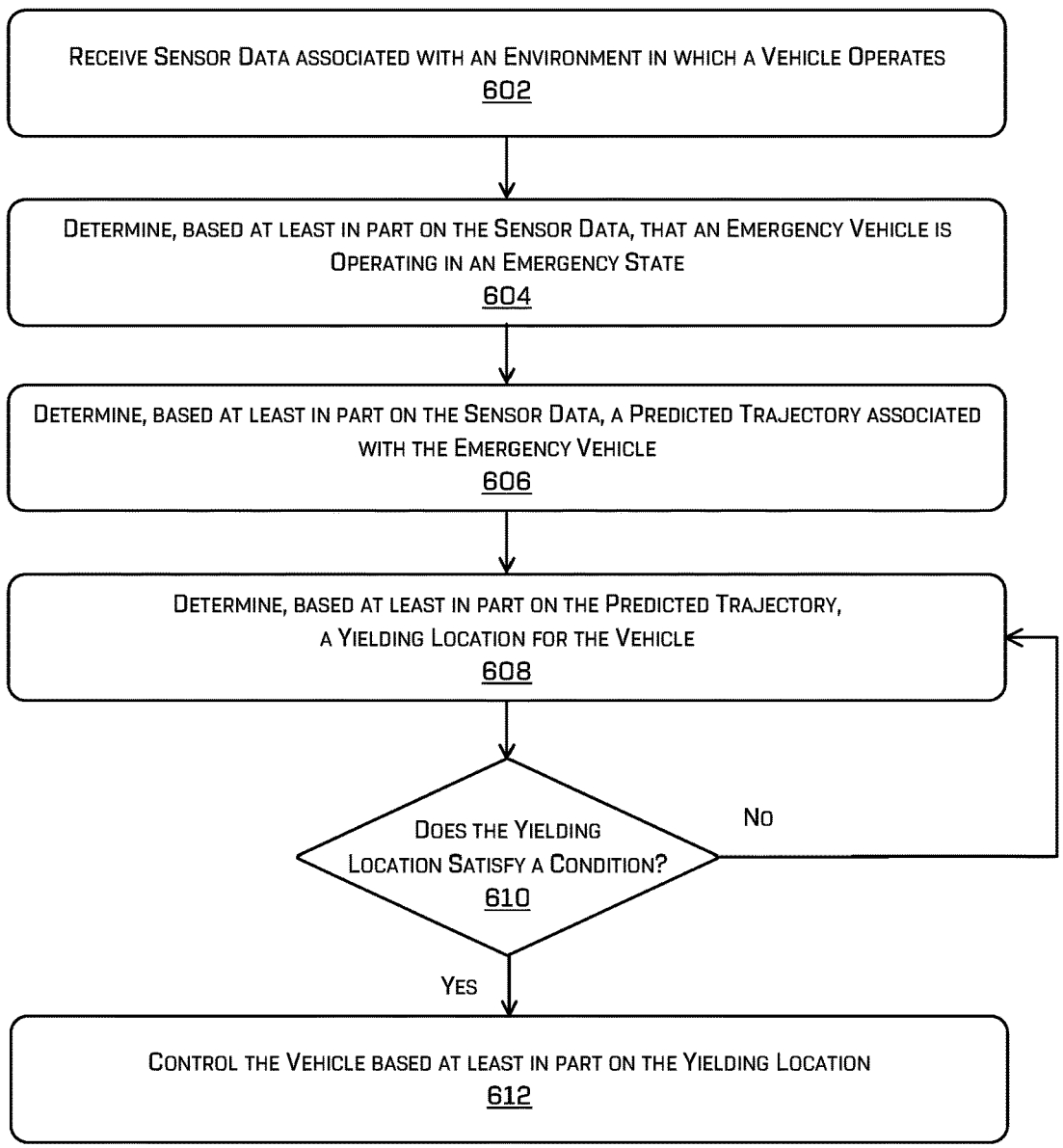
FIG. 6 depicts an example process for determining a location for a vehicle to yield to an emergency vehicle and controlling the vehicle to the location, in accordance with examples of the disclosure.

FIG. 6 depicts an example process 600 for determining a location for a vehicle to yield to an emergency vehicle and controlling the vehicle to the location, in accordance with examples of the disclosure. Some or all of the process 600 may be performed by one or more components in FIG. 4, as described herein. For example, some or all of the process 600 may be performed by the vehicle computing device(s) 404 and/or computing device(s) 436.

At operation 602, the process may include receiving sensor data associated with an environment in which a vehicle operates. The sensor data may include image data, lidar data, radar data, audio data, and the like. In some examples, the sensor data may be captured by one or more sensors associated with a vehicle, and/or one or more remote sensors, such as sensors associated with one or more other vehicles and/or one or more sensors mounted in the environment.

At operation 604, the process may include determining, based at least in part on the sensor data, that an emergency vehicle is operating in an emergency state. The determination of the emergency state may be based on one or more of a visual classification of the emergency vehicle and/or a light associated therewith (e.g., flashing light, lighting sequence, color of the light), an audio classification of a sound as an emergency sound, a direction of arrival associated with the emergency sound, determined actions of other objects in the environment (e.g., flow of traffic, motion trend of objects, average motion of objects), an indication received from a remote computing device, and the like, as described herein.

At operation 606, the process may include determining, based at least in part on the sensor data, a predicted trajectory associated with the emergency vehicle. In various examples, the predicted trajectory may represent a direction of travel and/or a velocity associated with the emergency vehicle through the environment. In some examples, the predicted trajectory may be determined based on one or more locations of the emergency vehicle over time. For example, the predicted trajectory may be based in part on previous movement of the emergency vehicle (e.g., history of movement through the environment). In various examples, the predicted trajectory may be determined based on a top-down representation of the environment, such as that described in the U.S. patent applications incorporated herein by reference above.

At operation 608, the process may include determining, based at least in part on the predicted trajectory, a yielding location for the vehicle. The yielding location may represent a location for the vehicle to move out of the path of the emergency vehicle. In various examples, the yielding location may be determined based on a flow of traffic associated with one or more object in an environment (e.g., motion trend). In such examples, the vehicle computing system may determine a flow of traffic and may determine the yielding location based on the flow. For example, the vehicle computing system may determine that objects in the environment are pulling over to the right side of the road to yield to the emergency vehicle. Based on the determination that a flow of traffic is to the right side of the road, the vehicle computing system may determine the yielding location on the right side of the road.

At operation 610, the process may include determining whether the yielding location satisfies a condition. The condition may include that the yielding location is located on a drivable surface, that it is clear of objects, that it is visible to the vehicle (e.g., not occluded), that it is within a threshold distance of the vehicle, that it is not associated with the path of the emergency vehicle, and/or other conditions associated with a yielding and/or parking location.

Based on a determination that the yielding location does not satisfy the condition ("No" at operation 610), the process may include determining another yielding location for the vehicle, such as that described with respect to operation 608.

Based on a determination that the yielding location does satisfy the condition ("Yes" at operation 610), the process, at operation 612, may include controlling the vehicle based at least in part on the yielding location. In various examples, the vehicle computing system may determine a yielding trajectory associated with vehicle movement from an initial location to the yielding location. In such examples, the vehicle computing system may control the vehicle based in part on the yielding trajectory. In some examples, the yielding trajectory may include an optimized trajectory based on a reference trajectory and/or a corridor. In some examples, the yielding trajectory may include a series of waypoints from the initial position to the yielding location. In such examples, the series of waypoints may include one or more waypoints that are not occupied and/or do not conflict with an object in the environment.

Figure 7:
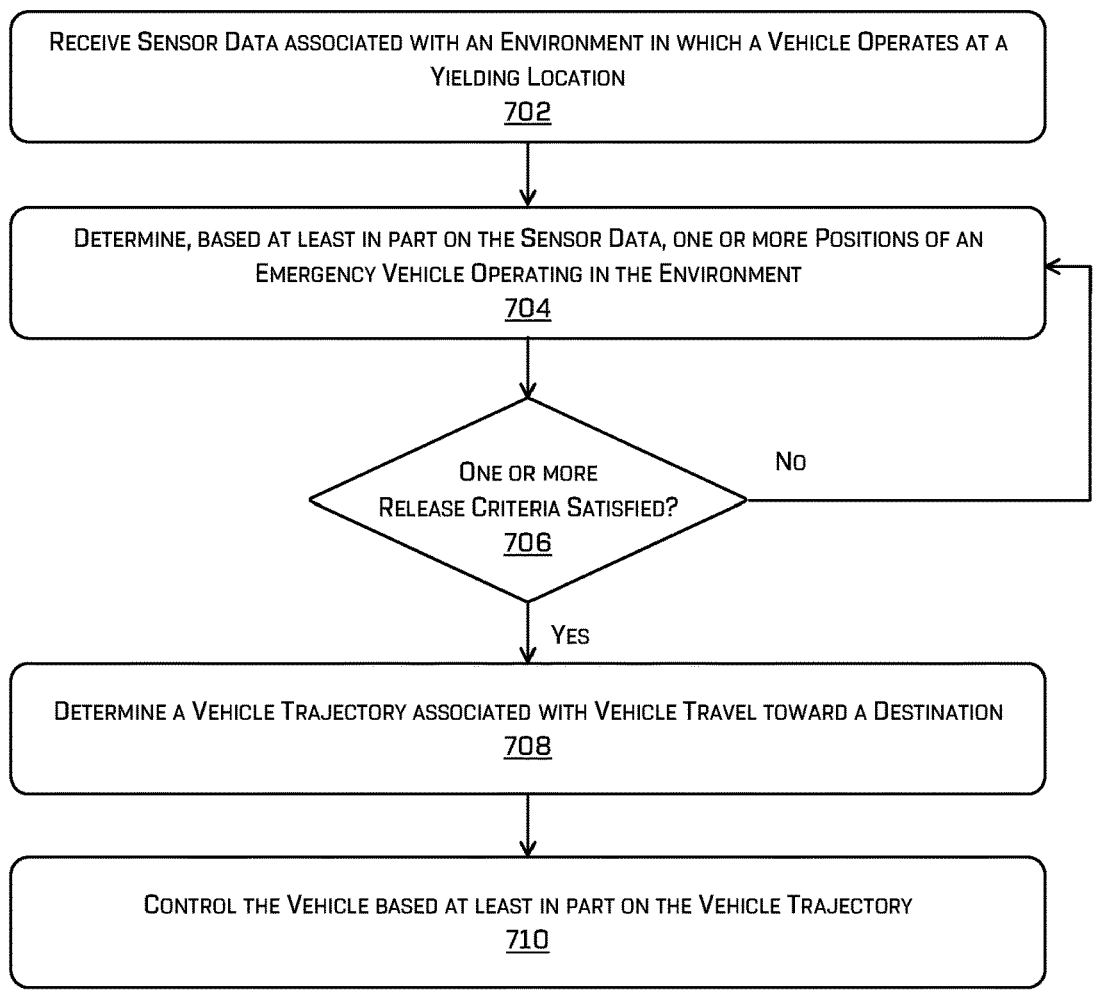
FIG. 7 depicts an example process for determining that one or more release criteria for a vehicle is satisfied and controlling the vehicle toward a destination, in accordance with examples of the disclosure.

FIG. 7 depicts an example process for determining that one or more release criteria for a vehicle is satisfied and controlling the vehicle toward a destination, in accordance with examples of the disclosure. Some or all of the process 700 may be performed by one or more components in FIG. 4, as described herein. For example, some or all of the process 700 may be performed by the vehicle computing device(s) 404 and/or computing device(s) 436.

At operation 702, the process may include receiving sensor data associated with an environment in which a vehicle operates at a yielding location. The sensor data may include image data, lidar data, radar data, audio data, and the like. In some examples, the sensor data may be captured by one or more sensors associated with a vehicle, and/or one or more remote sensors, such as sensors associated with one or more other vehicles and/or one or more sensors mounted in the environment. In various examples, the sensor data may include data captured at a second time after a first time associated with determining to yield to the emergency vehicle. In such examples, the sensor data may include updated sensor data.

At operation 704, the process may include determining, based at least in part on the sensor data, one or more positions of an emergency vehicle operating in the environment. The position(s) of the emergency vehicle may represent the emergency vehicle progress (movement) through the environment, such as in passing by and/or away from the vehicle.

At operation 706, the process may include determining whether one or more release criteria are satisfied. The release criteria may represent criteria associated with the vehicle release from the yielding location and/or yielding trajectory. The release criteria may include that the emergency vehicle is at least a threshold distance away from the vehicle, is traveling away from the vehicle, is no longer in the emergency state, that actions associated with the other objects are indicative of forward movement, and the like. In some examples, the vehicle computing system may determine that the release criteria are satisfied based on visual data and/or audio data. In some examples, the vehicle computing system may determine the release criteria are satisfied based on an indication of release received from the remote computing device. In such an example, the remote computing device and/or a remote operator may determine that the release criteria are satisfied and may provide the indication of release to the vehicle.

Based on a determination that the release criteria are not satisfied ("No" at operation 706), the process may include determining additional positions of the emergency vehicle operating in the environment, such as that described above in operation 704.

Based on a determination that the release criteria are satisfied ("Yes" at operation 706), the process, at operation 708, may include determining a vehicle trajectory associated with the vehicle travel toward a destination. In various examples, the vehicle trajectory may include a trajectory for the vehicle to join a route associated with travel to a destination. In some examples, the route may be associated with a route structure, such as that associated with one or more maps stored on the vehicle or otherwise accessible to the vehicle (e.g., stored on a remote computing device). In some examples, the vehicle computing system may determine a route return location associated with rejoining the route. In some examples, the route return location may be associated with a lateral distance from the route to the vehicle and a heading error associated with a heading of the vehicle. The heading error may include an angular difference between the heading of the vehicle and a direction associated with the route. In various examples, the vehicle trajectory may be based on the route return location, such as a trajectory generated between the yielding location and the route return location. In some examples, the vehicle trajectory may be determined based on an optimization of a reference trajectory between the yielding location and the route return location and/or a corridor associated therewith. In some examples, the yielding trajectory may be determined based on an input received from a remote computing device, such as from a remote operator. In such examples, the vehicle computing system may receive the input, such as one or more waypoints associated with vehicle movement, and may determine the vehicle trajectory based on the input.

At operation 710, the process may include controlling the vehicle based at least in part on the vehicle trajectory. In various examples, the vehicle computing system may control the vehicle to the destination based at least in part on the route.

EXAMPLE CLAUSES

A: A system comprising: a sensor; one or more processors; and one or more computer-readable media storing instructions executable by the one or more processors, wherein the instructions, when executed, cause the system to perform operations comprising: receiving, from at least the sensor, sensor data representing an environment of a vehicle, wherein the sensor data comprises at least audio data and visual data, wherein the visual data comprises at least one of image data captured by a camera or lidar data captured by a lidar sensor; determining, based at least in part on the audio data and the visual data, that an emergency vehicle is operating in the environment; determining, based at least in part on the sensor data, an emergency vehicle location and a predicted trajectory associated with the emergency vehicle; determining, based at least in part on the emergency vehicle location and the predicted trajectory, to yield to the emergency vehicle; determining, based at least in part on determining to yield, a yielding location for the vehicle to move outside a path associated with the predicted trajectory of the emergency vehicle; and controlling the vehicle based at least in part on the yielding location.

B: The system as paragraph A describes, the operations further comprising: sending at least one of the sensor data or data based on the sensor data to a remote computing device; and receiving, from the remote computing device, a second indication that the emergency vehicle is operating in the environment, wherein determining that the emergency vehicle is operating in the environment is based at least in part on the second indication.

C: The system as either paragraph A or paragraph B describe, wherein determining that the emergency vehicle is operating in the environment comprises: determining that the audio data is associated with the emergency vehicle; and determining that a direction of arrival associated with the audio data is indicative of an approaching emergency vehicle.

D: The system as any one of paragraphs A-C describe, wherein determining that the emergency vehicle is operating in the environment comprises: determining that a classification of a detected object represented in the sensor data comprises the emergency vehicle; and at least one of: determining that a lighting sequence associated with the detected object is indicative of an emergency state; or determining that a light associated with the lighting sequence comprises at least one of a blue or a red light.

E: The system as any one of paragraphs A-D describe, wherein determining that the emergency vehicle is operating in the environment comprises: determining, based at least in part on the sensor data, a first object operating on a drivable surface associated with the vehicle in the environment; determining a first trajectory associated with the first object; and determining a difference between the first trajectory and a first expected trajectory associated with the first object, wherein determining to yield is further based on the difference.

F: A computer-implemented method comprising: receiving sensor data associated with an environment in which a vehicle operates; determining, based at least in part on the sensor data, that an emergency vehicle is operating in the environment; determining a likelihood that the emergency vehicle will impact motion of the vehicle; determining, based on the likelihood, to yield to the emergency vehicle; and controlling the vehicle based at least in part on determining to yield.

G: The computer-implemented method as paragraph F describes, wherein determining that the emergency vehicle is operating in the environment further comprises at least one of: determining that audio data of the sensor data is associated with the emergency vehicle; determining that a direction of arrival associated with the audio data is indicative of an approaching emergency vehicle; determining that a classification of a first detected object comprises the emergency vehicle; determining that a light associated with the first detected object is indicative of an emergency state; determining that the light comprises at least a red light; or determining that an action associated with at least a second detected object in the environment is indicative of the emergency vehicle operating, where in the action comprises at least one of: a pull-over action; a lane-change action; a yielding action; a slowing action; or a turning action.

H: The computer-implemented method as either paragraph F or paragraph G describes, further comprising: determining, based at least in part on the sensor data, a first object operating on a drivable surface associated with the vehicle in the environment; determining a first trajectory associated with the first object; determining a difference between the first trajectory and a first expected trajectory, wherein determining the likelihood is based at least in part on the difference.

I: The computer-implemented method as paragraph H describes, further comprising: determining, based at least in part on the sensor data, a second object operating on the drivable surface associated with the vehicle in the environment; determining a second trajectory associated with the second object; and determining an average motion associated with first trajectory and the second trajectory, wherein determining to yield is based at least in part on the average motion.

J: The computer-implemented method as any one of paragraphs F-I describe, further comprising: sending, based at least on the likelihood, at least one of the sensor data or data based on the sensor data to a remote computing device; and receiving, from the remote computing device, a confirmation that the emergency vehicle is operating in the environment, wherein determining that the emergency vehicle is operating in the environment is further based at least in part on the confirmation.

K: The computer-implemented method as any one of paragraphs F-J describe, further comprising: receiving additional sensor data from the sensor; determining, based at least in part on the additional sensor data, that one or more release criteria are satisfied; sending, based at least in part on determining that the one or more release criteria are satisfied, at least one of the additional sensor data or data based on the additional sensor data to a remote computing device; receiving, from the remote computing device, confirmation of the one or more release criteria being satisfied; and controlling the vehicle toward a destination based at least in part on the confirmation.

L: The computer-implemented method as paragraph K describes, further comprising at least one of: determining a vehicle trajectory associated with vehicle travel to the destination; or receiving, from the remote computing device, a waypoint associated with vehicle travel to the destination, wherein controlling the vehicle is based at least in part on at least one of the vehicle trajectory or the waypoint.

M: The computer-implemented method as any one of paragraphs F-L describe, wherein determining to yield comprises determining a yielding location comprising at least one of: determining that the yielding location is associated with a drivable surface; determining that the yielding location is outside a path of the emergency vehicle; determining that a predicted trajectory associated with the emergency vehicle is associated with a first lane of a road in the environment and that the yielding location is associated with a second lane of the road; determining that an object is not located at the yielding location; or determining an average direction of movement associated with one or more other vehicles operating in the environment, wherein the yielding location is associated with the average direction of movement from an initial location associated with the vehicle.

N: The computer-implemented method as paragraph M describes, further comprising: determining that the emergency vehicle is irrelevant to the vehicle; determining a vehicle trajectory from the yielding location to a destination associated with the vehicle; and controlling the vehicle based at least in part on the vehicle trajectory.

O: The computer-implemented method as paragraph N describes, wherein determining that the emergency vehicle is irrelevant to the vehicle comprises at least one of: receiving, from a remote computing device associated with a remote operator, an indication that the emergency vehicle is irrelevant to the vehicle; determining that a location associated with the emergency vehicle is indicative of irrelevance to the vehicle; determining that a predicted trajectory associated with the emergency vehicle is indicative of irrelevance to the vehicle; determining that a direction of arrival of an audio signal associated with the emergency vehicle is indicative of irrelevance to the vehicle; or determining that an average direction of movement associated with one or more objects in the environment is indicative of the emergency vehicle being irrelevant to the vehicle.

P. The computer-implemented method as any one of paragraphs F-O describe, further comprising at least one of: determining, based at least in part on a first machine learned model, that the emergency vehicle is operating in the environment; or determining, based at least in part on a second machine learned model, that the emergency vehicle is irrelevant to the vehicle, wherein at least one of the determining that the emergency vehicle is operating in the environment or that the emergency vehicle is irrelevant to the vehicle are based at least in part on at least one of: audio data; image data; lidar data; or top-down representations of scenes comprising emergency vehicles.

Q: A system or device comprising: a processor; and a non-transitory computer-readable medium storing instructions that, when executed, cause a processor to perform a computer-implemented method as any one of paragraphs F-P describe.

R: A system or device comprising: a means for processing; and a means for storing coupled to the means for processing, the means for storing including instructions to configure one or more devices to perform a computer-implemented method as any one of paragraphs F-P describe.

S: One or more non-transitory computer-readable media storing instructions that, when executed, cause one or more processors to perform operations comprising: receiving sensor data associated with an environment in which a vehicle operates; determining, based at least in part on the sensor data, that an emergency vehicle is operating in the environment; determining, based at least in part on the sensor data, a predicted trajectory associated with the emergency vehicle; determining, based at least in part on the predicted trajectory, to yield to the emergency vehicle; and controlling the vehicle based at least in part on determining to yield.

T: The one or more non-transitory computer-readable medium as paragraph S describes, the operations further comprising: determining that the emergency vehicle is irrelevant to the vehicle; determining a vehicle trajectory for the vehicle to travel to a destination; and controlling the vehicle based at least in part on the vehicle trajectory.

U. The one or more non-transitory computer-readable medium as either paragraph S or T describe, the operations further comprising: determining, based on the sensor data, a first traffic flow associated with movement of one or more objects in the environment; comparing the first traffic flow to a second traffic flow; and determining, based at least in part on the comparing, that the first traffic flow indicates one or more reactions of the one or more objects to the emergency vehicle, wherein determining to yield is based at least in part on the first traffic flow.

V: The one or more non-transitory computer-readable medium as paragraph U describes, the operations further comprising determining a yielding location for the vehicle based at least in part on one of: determining that the yielding location is associated with a drivable surface; determining that the yielding location is outside the predicted trajectory; determining that the predicted trajectory is associated with a first lane of a road in the environment and that the yielding location is associated with a second lane of the road; determining that an object is not located at the yielding location; or the first traffic flow.

While the example clauses described above are described with respect to one particular implementation, it should be understood that, in the context of this document, the content of the example clauses can also be implemented via a method, device, system, computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
   receiving sensor data from a sensor associated with an autonomous vehicle traversing an environment;
   determining, based at least in part on the sensor data, a traffic flow associated with objects operating in the environment;
   determining a difference between the traffic flow and an expected traffic flow;
   based at least in part on determining that the difference meets or exceeds a threshold, determining that an emergency vehicle is operating in the environment;
   determining, based at least in part on the sensor data, a predicted trajectory associated with the emergency vehicle;
   determining, based at least in part on the predicted trajectory, an action of the autonomous vehicle;
   determining, based on the action, a trajectory for performing the action;
   determining, based on a current trajectory of the autonomous vehicle and the trajectory, an acceleration needed to switch to the trajectory from the current trajectory of the autonomous vehicle;
   determining that the acceleration is equal to or less than a threshold acceleration; and
   based on determining that the acceleration is equal to or less than the threshold acceleration, controlling the autonomous vehicle based on the trajectory.

2. The system of claim 1, the operations further comprising:
   determining, based at least in part on the acceleration, a cost associated with the trajectory, the cost being indicative of at least comfort of a passenger of the autonomous vehicle, wherein the controlling the autonomous vehicle is determined based at least in part on the cost.

3. The system of claim 2, wherein the cost is further based at least in part on one or more of: safety of the autonomous vehicle, progress toward a destination, or traffic rules.

4. The system of claim 1, the operations further comprising:
   determining, based at least in part on the sensor data, that an additional vehicle is operating in the environment;
   determining a predicted trajectory of the additional vehicle; and
   determining a deviation of the additional vehicle from the predicted trajectory of the additional vehicle, wherein the determining the action of the autonomous vehicle is based at least in part on the deviation of the additional vehicle.

5. The system of claim 1, the operations further comprising:
   determining a likelihood that the emergency vehicle will impact motion of the autonomous vehicle;
   sending, based at least on the likelihood, at least one of the sensor data or data based on the sensor data to a remote computing device; and
   receiving, from the remote computing device, an indication that the emergency vehicle is operating in the environment,
   wherein determining that the emergency vehicle is operating in the environment is based at least in part on the indication.

6. The system of claim 1, wherein the action comprises at least one of: a pull-over action, a lane-change action, a yielding action, a slowing action, or a turning action.

7. The system of claim 1, the operations further comprising:
   receiving additional sensor data;
   determining, based at least in part on the additional sensor data, that other vehicles operating in the environment have started movement; and
   based on determining that the other vehicles have started movement, controlling the autonomous vehicle on a continuing trajectory toward a destination.

8. The system of claim 1, the operations further comprising: determining, based at least in part on the sensor data, a motion trend of objects operating in the environment; and determining that a difference between the motion trend and an expected motion trend meets or exceeds a threshold, wherein determining that the emergency vehicle is operating in the environment is further based at least in part on the difference meeting or exceeding the threshold.

9. The system of claim 1, the operations further comprising:
- determining a yielding location associated with a drivable surface in the environment, wherein the yielding location is outside the predicted trajectory associated with the emergency vehicle; and
- determining, based at least in part on the current trajectory and the predicted trajectory, a yielding trajectory to the yielding location,
- wherein controlling the autonomous vehicle comprises yielding to the emergency vehicle following the yielding trajectory.

10. A method comprising:
- receiving a vehicle trajectory associated with a vehicle traversing an environment;
- receiving sensor data associated with the environment;
- determining, based at least in part on the sensor data, a motion trend of objects operating in the environment;
- determining that a difference between the motion trend and an expected motion trend meets or exceeds a threshold;
- determining, based at least in part on determining that the difference meets or exceeds the threshold, that an emergency vehicle is operating in the environment;
- determining, based at least in part on the vehicle trajectory and a trajectory associated with the emergency vehicle, a yielding trajectory to yield to the emergency vehicle;
- determining a first cost associated with the vehicle continuing on the vehicle trajectory and a second cost associated with the vehicle following the yielding trajectory; and
- controlling, based on comparing the first cost and the second cost, the vehicle on one of the vehicle trajectory or the yielding trajectory.

11. The method of claim 10, wherein controlling the vehicle on the yielding trajectory comprises:
- determining a yielding location associated with a drivable surface in the environment;
- determining that the yielding location is outside a predicted trajectory of the emergency vehicle; and
- determining that an object is not located at the yielding location.

12. The method of claim 10, wherein determining that the emergency vehicle is operating in the environment further comprises:
- determining that an audio portion of the sensor data is associated with an approaching emergency vehicle;
- determining that a visual portion of the sensor data is associated with at least one of a blue or a red light; and
- determining, based at least in part on the audio portion and the visual portion of the sensor data, that a classification of a first detected object comprises the emergency vehicle.

13. The method of claim 10, wherein the first cost or the second cost is based at least in part on one or more of: a likelihood that the emergency vehicle will impact motion of the vehicle, comfort of a passenger of the vehicle, or vehicle operation rules.

14. The method of claim 13, wherein the likelihood is based on at least one of:
- receiving, from a remote computing device associated with a remote operator, an indication that the emergency vehicle is irrelevant to the vehicle;
- determining that the trajectory associated with the emergency vehicle is indicative of irrelevance to the vehicle;
- determining that a direction of arrival of an audio signal associated with the emergency vehicle is indicative of irrelevance to the vehicle; or
- determining that an average direction of movement associated with one or more objects in the environment is indicative of the emergency vehicle being irrelevant to the vehicle.

15. The method of claim 10, further comprising:
- receiving additional sensor data;
- determining, based at least in part on the additional sensor data, that one or more release criteria are satisfied;
- determining a continuing trajectory associated with vehicle travel toward a destination; and
- controlling the vehicle on the continuing trajectory.

16. The method of claim 15, wherein determining that the one or more release criteria are satisfied comprises at least one of:
- determining that a distance between the vehicle and the emergency vehicle meets or exceeds a threshold distance;
- determining that the trajectory associated with the emergency vehicle diverges from the vehicle trajectory;
- determining that audio data and visual data of the additional sensor data are indicative of the emergency vehicle not operating in emergency state;
- determining that other vehicles operating in the environment have started movement; or
- receiving, from a remote computing device associated with a remote operator, an indication that the emergency vehicle is irrelevant to the vehicle.

17. The method of claim 10, further comprising:
- predicting, based at least in part on the sensor data, the trajectory associated with the emergency vehicle.

18. The method of claim 10, wherein the motion trend is based at least in part on motion associated with a threshold percentage of objects operating on a drivable surface of the environment.

19. The method of claim 10, further comprising:
- determining, based on a current trajectory of the vehicle and the yielding trajectory, a change in motion of the vehicle associated with executing the yielding trajectory; and
- determining that the change in motion is equal to or less than a threshold change,
- wherein controlling the vehicle is based at least in part on determining that the change in motion is equal to or less than the threshold change.

* * * * *